United States Patent
Hashidume et al.

(10) Patent No.: US 9,582,228 B2
(45) Date of Patent: Feb. 28, 2017

(54) DOCUMENT ADMINISTRATION SYSTEM AND DOCUMENT ADMINISTRATION METHOD

(75) Inventors: Hiroshi Hashidume, Tokyo (JP); Kazuhiro Ogura, Kanagawa-ken (JP); Minoru Yoshida, Tokyo (JP); Akira Saito, Tokyo (JP); Koichi Moriya, Kanagawa-ken (JP)

(73) Assignees: TOSHIBA TEC KABUSHIKI KAISHA, Tokyo (JP); KABUSHIKI KAISHA TOSHIBA, Tokyo (JP)

( * ) Notice: Subject to any disclaimer, the term of this patent is extended or adjusted under 35 U.S.C. 154(b) by 146 days.

(21) Appl. No.: 13/545,164

(22) Filed: Jul. 10, 2012

(65) Prior Publication Data
US 2013/0016375 A1    Jan. 17, 2013

(30) Foreign Application Priority Data

Jul. 11, 2011    (JP) .................................. 2011-152921

(51) Int. Cl.
*H04N 1/60*    (2006.01)
*G06K 1/00*    (2006.01)
(Continued)

(52) U.S. Cl.
CPC .......... *G06F 3/1222* (2013.01); *G06F 3/1239* (2013.01); *G06F 3/1285* (2013.01);
(Continued)

(58) Field of Classification Search
CPC ... H04N 2201/3226; H04N 2201/3274; H04N 2201/3276; H04N 2201/3277;
(Continued)

(56) References Cited

U.S. PATENT DOCUMENTS 6,373,575 B1 * 4/2002 Takayama et al. ........... 356/445
8,899,705 B2 * 12/2014 Iguchi ................ H04N 1/00567
347/1
(Continued)

FOREIGN PATENT DOCUMENTS

JP    07-239641    9/1995
JP    2002-245075    8/2002
(Continued)

OTHER PUBLICATIONS

Japanese Office Action for Japanese Patent Application No. 2011-152921 mailed on Jun. 4, 2013.
(Continued)

*Primary Examiner* — Richard Zhu
(74) *Attorney, Agent, or Firm* — Amin, Turocy & Watson LLP

(57) ABSTRACT

A document administration system includes an administration unit, a discrimination information image discriminating unit, and an image forming apparatus which, forms an image on a recording medium in case that the discrimination information image discriminating unit discriminates that the recording medium has the discrimination information image before the image is formed on the recording medium, and forms the image and the discrimination information image based on the discrimination information connected to the image on the recording medium in case that the discrimination information image discriminating unit discriminates that the recording medium does not have the discrimination information image before the image is formed on the recording medium.

12 Claims, 21 Drawing Sheets

(51) Int. Cl.
*G06F 3/12* (2006.01)
*G06K 15/00* (2006.01)

(52) U.S. Cl.
CPC ........ *G06K 15/4095* (2013.01); *G06F 3/1219* (2013.01); *H04N 2201/323* (2013.01); *H04N 2201/3246* (2013.01)

(58) Field of Classification Search
CPC ... H04N 2201/3228; H04N 2201/3229; G03G 2215/00092
USPC .............................................. 358/3.28, 1.15
See application file for complete search history.

(56) References Cited

U.S. PATENT DOCUMENTS

| | | | |
|---|---|---|---|
| 2005/0171914 A1* | 8/2005 | Saitoh | 705/51 |
| 2005/0223331 A1* | 10/2005 | Wolff et al. | 715/744 |
| 2006/0275064 A1* | 12/2006 | Minari | 399/366 |
| 2009/0106249 A1* | 4/2009 | Saito | 707/9 |
| 2009/0225366 A1 | 9/2009 | Emori | |
| 2010/0118349 A1* | 5/2010 | Ozawa | H04N 1/00355 358/401 |
| 2010/0272449 A1* | 10/2010 | Yoshida | H04N 1/32133 399/2 |
| 2010/0290075 A1 | 11/2010 | Ogura et al. | |
| 2011/0065056 A1* | 3/2011 | Iguchi et al. | 432/32 |
| 2011/0212397 A1* | 9/2011 | Aoki | G03G 9/08755 430/108.6 |
| 2011/0236843 A1* | 9/2011 | Iguchi | H04N 1/00567 432/32 |
| 2014/0193184 A1* | 7/2014 | Ishikawa | B41M 7/0009 399/341 |

FOREIGN PATENT DOCUMENTS

| | | |
|---|---|---|
| JP | 2005-257995 | 9/2005 |
| JP | 2007-038460 | 2/2007 |
| JP | 2010-253951 | 11/2010 |
| JP | 2011-010328 | 1/2011 |
| JP | 2011-039517 | 2/2011 |

OTHER PUBLICATIONS

Japanese Office Action for Japanese Patent Application No. 2011-152921 mailed on Dec. 12, 2013.
Japanese Office Action for Japanese Patent Application No. 2011-152921 mailed on May 14, 2014.
Office Action of Notification of Reason(s) for Refusal for Japanese Patent Application No. 2011-152921 Dated Jul. 7, 2015, 5 pages.
Japanese Office Action for Japanese Patent Application No. 2016-032805 drafted on Oct. 3, 2016.

* cited by examiner

| EXAMPLE OF ADMINISTRATION INFORMATION ADMINISTERED BY QR CODE | |
|---|---|
| INFORMATION GIVEN IN CONNECTION WITH QR CODE WHEN INITIAL DOCUMENT IS CREATED AND PRINTED | ADMINISTRATION INFORMATION GIVEN (FURTHER ADDED) AT THE TIME OF SCANNER READING |
| COMPANY | READING MACHINE |
| DIVISION ONE BELONGS TO FLOOR AREA | READING TIME AND DATE |
| CREATOR | DECOLORING TIME AND DATE |
| PRINT MACHINE | NUMBER OF TIMES OF DECOLORING |
| PRINT TIME AND DATE | DECOLORING TEMPERATURE |
| SECURITY LEVEL | DATA INFORMATION AT THE TIME OF DECOLORING |
| DECOLORING ACCELERATION LEVEL | CONVERSION INTO PDF |
| ORIGINAL DATA REFERENCE LOCATION (DIRECTORY) | PDF ELECTRONIC DATA |
| PRINT COLORING AGENT ATTRIBUTE/ FIXING TEMPERATURE/ TRANSFER VOLTAGE | DIFFERENCE (DIFFERENCE ADMINISTRATION FROM ORIGINAL DATA FOR EACH GENERATION INFORMATION) |
| PRINT COLORING AGENT DECOLORING TEMPERATURE | OCR PROCESSING |
|  | OCR ELECTRONIC DATA |
|  | OCR TRANSLATION DATA |

FIG. 5

CONFIGURATION EXAMPLE OF ADMINISTRATION TABLE

27a

| DOCUMENT ID | FILE NAME | PAGE | MASTER DATA |
|---|---|---|---|
| 0001 | aaa.txt | 3 | 1101000101.... |
| 0002 | bbb.doc | 5 | 0001001100.... |

(a)

27b

| PAGE ID | DOCUMENT ID | PAGE NUMBER | SECURITY LEVEL | EXPIRATION DATE | OUTPUT FLAG |
|---|---|---|---|---|---|
| 000001 | 0001 | 1 | 4 | 2015/03/31 | false |
| 000002 | 0001 | 2 | 4 | 2015/03/31 | false |
| 000003 | 0001 | 3 | 1 | 2008/11/02 | true |
| 000004 | 0004 | 1 | 3 | 2008/09/18 | false |

(b)

27c

| PRINT ID | PRINT ID OF ONE GENERATION BEFORE | NUMBER OF GENE-RATION | PAGE ID | DECOLORING FLAG | USER ID |
|---|---|---|---|---|---|
| 000000001 | — | 0 | 000001 | false | 00001 |
| 000000002 | 000000001 | 1 | 000001 | false | 00001 |
| 000000003 | 000000002 | 2 | 000001 | false | 00001 |
| 000000004 | — | 0 | 000002 | true | 00002 |

(c)

27d

| TIME AND DATE | USER ID | OPERATION | SIZE | PRINT ID |
|---|---|---|---|---|
| 2009-09-01 13:23 | 00121 | COPY | A4 | 000004321 |
| 2009-09-10 08:44 | 00122 | REUSE | A4 | 000000022 |
| 2009-09-10 20:13 | 00245 | PRINT | A3 | 001020003 |
| 2009-09-15 16:49 | 00361 | RECYCLE | A4 | 000005274 |

(d)

27e

| ACCEPTABLE AMOUNT (NUMBER OF SHEETS) OF OFFICE | FLOOR | ACCEPTABLE AMOUNT (NUMBER OF SHEETS) BY FLOOR | DIVISION | ACCEPTABLE AMOUNT (NUMBER OF SHEETS) BY AREA | USER ID | ACCEPTABLE AMOUNT (NUMBER OF SHEETS) BY USER |
|---|---|---|---|---|---|---|
| 500,000 | A WING THIRD FLOOR | 100,000 | DEVELOP-MENT | 20,000 | 00121 | 1,000 |
| 500,000 | A WING THIRD FLOOR | 100,000 | DEVELOP-MENT | 20,000 | 00122 | 1,000 |
| 500,000 | A WING THIRD FLOOR | 100,000 | DESIGN | 60,000 | 00151 | 1,000 |
| 500,000 | A WING THIRD FLOOR | 100,000 | DESIGN | 60,000 | 00152 | 1,000 |
| 500,000 | B WING FIRST FLOOR | 200,000 | ACCOUNT-ING | 50,000 | 00201 | 1,000 |
| 500,000 | B WING FIRST FLOOR | 200,000 | ACCOUNT-ING | 50,000 | 00202 | 1,000 |
| 500,000 | B WING FIRST FLOOR | 200,000 | GENERAL AFFAIRS | 50,000 | 00221 | 1,000 |
| 500,000 | B WING FIRST FLOOR | 200,000 | GENERAL AFFAIRS | 50,000 | 00222 | 1,000 |

(e)

27f

| USER ID | USED AMOUNT OF SHEETS (NUMBER OF SHEETS) | ACCEPTABLE AMOUNT (NUMBER OF SHEETS) | USAGE RATE (%) |
|---|---|---|---|
| 00001 | 58 | 1,000 | 5.8 |
| 00002 | 682 | 1,000 | 68.2 |
| 00003 | 1045 | 1,000 | 104.5 |
| 00004 | 238 | 1,000 | 23.8 |

| No. | DOCUMENT NAME | PRINTING PERSON | TIME AND DATE |
|---|---|---|---|
| 1. | DOCUMENT A | FULL NAME A | 2009/11/05 |
| 2. | DOCUMENT B | FULL NAME B | 2009/11/05 |

USER "AAA"

○ PRINT

SELECT DOCUMENT TO BE PRINTED AND PUSH PRINT BUTTON

1/1

[DELETE] [SELECT WHOLE] [CLEAR SELECTION] [PRINT]

FIG. 13

USER "AAA"

○ DECOLOR ENTRY

☑ SURELY SECURITY DISPOSITION

DOCUMENT ADMINISTRATION SYSTEM AND DOCUMENT ADMINISTRATION METHOD

CROSS-REFERENCE TO RELATED APPLICATION

This application is based upon and claims the benefit of priority from the prior Japanese Patent Application No. 2011-152921, filed on Jul. 11, 2011, the entire contents of which are incorporated herein by reference.

FIELD

Exemplary embodiments described herein relate to a document administration system and a document administration method which can form an image using erasable coloring agent.

BACKGROUND

Recently, it has been performed to print an image on a sheet using erasable coloring agent such as ink including leuco dye, in order to erase the image formed on the sheet and make the sheet to be reused by an image forming apparatus such as an MFP (Multi Function Peripheral). On the other hand, in case that various images are printed on a sheet, the necessity to administer the sheet or to administer the image data has been generated from a standpoint of security, from the time of forming the image to the time of decoloring, recycling or disposing the sheet.

BRIEF DESCRIPTION OF THE DRAWINGS

FIG. 5 is a table showing administration information to control with a QR code of the first embodiment;

FIG. 9 is a table showing a configuration example of an administration table of the document administration system of the first embodiment, wherein (a) shows a memory area of information related to a document (image) (manuscript) to be printed, (b) shows a memory area of information related to each page to be printed, (c) shows a memory area of information related to printed or copied image, (d) shows a memory area of information related to an operation log, (e) shows a memory area of information related to an amount of usable sheets, and (f) shows a memory area of information related to a used amount of sheets;

FIG. 12 is an explanatory diagram showing a display example of a print image plane of the first embodiment;

FIG. 13 is an explanatory diagram showing a display example of a decolor entry image plane of the first embodiment;

DETAILED DESCRIPTION

In general, according to one embodiment, there is provided a document administration system including: an administration unit to administer administration information of an image formed on a recording medium in connection with discrimination information of the recording medium; a discrimination information image discriminating unit to discriminate whether the recording medium has an discrimination information image based on the discrimination information before the image is formed; and an image forming apparatus, including a first image forming unit to form the image with erasable coloring agent, which forms the image on the recording medium, or forms the image and the discrimination information image based on the discrimination information connected to the image on the recording medium, based on a discrimination result of the discrimination information image discriminating unit.

Hereinafter, embodiments will be described.

Figure 1:
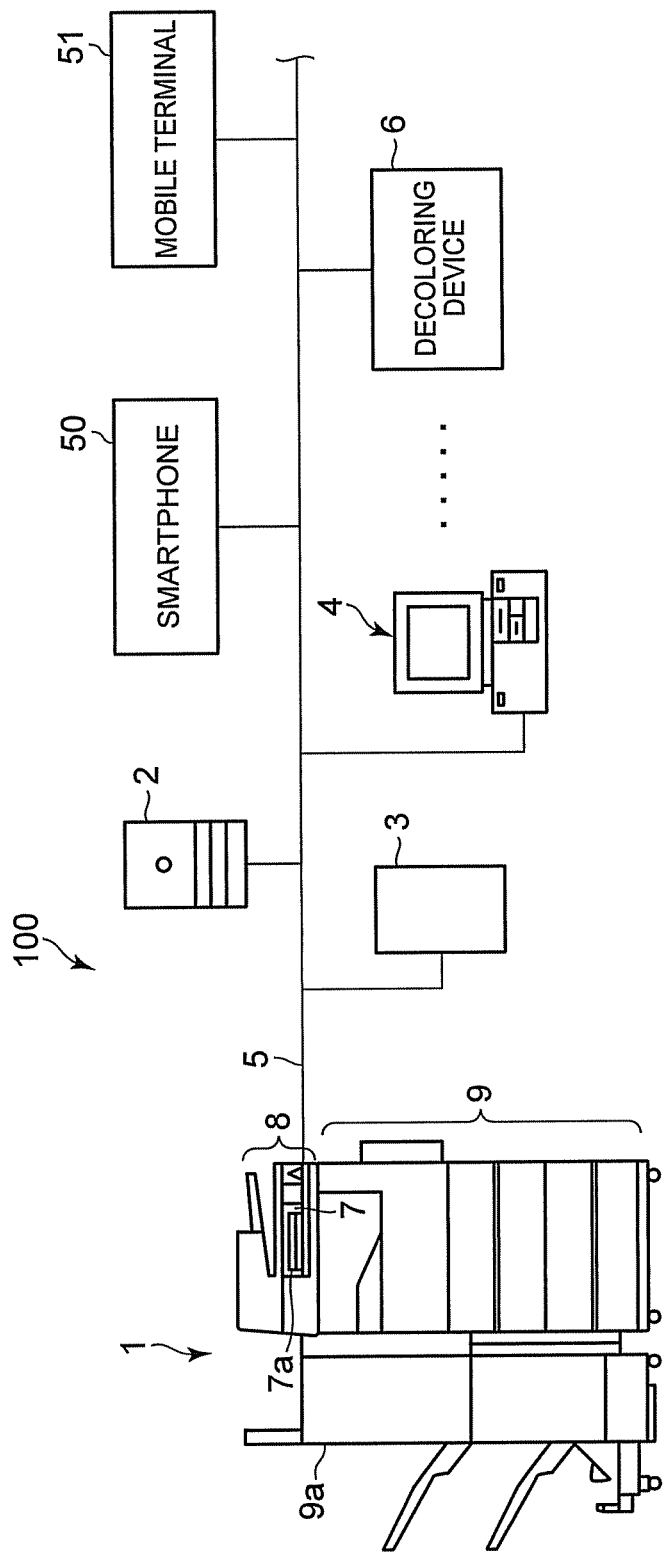
FIG. 1 is a schematic configuration diagram showing a document administration system of a first embodiment.

(First Embodiment) FIG. 1 shows a document administration system 100 of a first embodiment. The document administration system 100 includes a digital complex machine (hereinafter, referred to as an MFP (Multi Function Peripheral)) 1, a print server 2 serving as an administration unit, a user administration server 3, a user terminal 4, a decoloring device 6, a smartphone 50 and a mobile terminal 51 and so on. Each of the MFP 1, the print server 2, the user administration server 3, the user terminal 4, the decoloring device 6, the smartphone 50 and the mobile terminal 51 and so on is provided with communication function to perform data communication. The document administration system 100 connects among the MFP 1, the print server 2, the user administration server 3, the user terminal 4, the decoloring device 6, the smartphone 50 and the mobile terminal 51 and so on, each of which are provide with communication function, with a local area network 5. The local area network 5 may be put into practice with wireless communication. In addition, the communication function may be put into practice with cloud network.

The document administration system 100 administers an image using discrimination information, for example, and administers the sheet that is a recording medium on which the image is printed or copied. The document administration system 100 publishes a print ID, for example, as the discrimination information. The document administration system 100 connects the print ID with administration information to thereby administer the image and administer the sheet. The administration information includes, image data, time and date of printing the image, a person to print the image, a machine to print the image, security setting of the image (a security level), expiration date of the image, kind of coloring agent at the time of printing (whether or not it is erasable coloring agent), generation information of the image (the number of times of coping, for example) and so on, for example.

The MFP 1 performs a couple of image forming processings, such as image forming processing with erasable coloring agent which is decolorized with chemical reaction when heated to a prescribed temperature and image forming processing with unerasable coloring agent which is not decolorized even when heated to the prescribed temperature. The MFP 1 forms an image with erasable coloring agent in order to make the sheet to be reused. But, the image forming processing with erasable coloring agent is not limited to the case where the reuse of the sheet is aimed. The MFP 1 forms a discrimination information image corresponding to the discrimination information connected to the administration information to administer the image on a sheet using unerasable coloring agent. The document administration system 100 performs processing to store the discrimination information in connection with the administration information having image data in a prescribed memory area.

Here, "the discrimination information" is information to discriminate a sheet and further discriminate image data in connection with the sheet, and is information to identify the sheet and the image formed on the sheet. In addition, "the discrimination information image" is an image corresponding to the discrimination information, and an image formed on the sheet. For example, the discrimination information is a character string composed of numeric characters and characters, and the discrimination information image is an image, such as a bar code and a QR code (registered trademark), indicating the discrimination information, which is readable by an image reading sensor. As a matter of course, if the discrimination information of the character string is readable, the discrimination information of the character string may be used as the discrimination information image without modification. In addition, "the discrimination information image" is an image corresponding to the discrimination information, and when a sheet is made of tangled thin fibers made from wood pulp, the pattern in tangled state of the fibers is the image readable by an image reading sensor. In the following description, an example to use an image of QR code as the discrimination information image will be described The MFP 1 is provided with scanner function, printer function and network communication function. For example, the MFP 1 performs, as a network printer, print processing which is requested from the user terminal 4, the smartphone 50 or the mobile terminal 51.

The print server 2 is a server computer. The print server 2 administers the print job which is requested from the user terminal 4, the smartphone 50 or the mobile terminal 51, for example. The user administration server 3 administers user information. The user terminal 4, the smartphone 50 or the mobile terminal 51 is a terminal device which a user uses. The user terminal 4 may be a personal computer, for example.

Next, the MFP 1 will be described. As shown in FIG. 1, the MFP 1 includes an operation panel 7, a scanner (an image reader) 8, a printer (an image forming unit) 9, a finisher 9a. The MFP 1 inputs and outputs image data through the local area network 5. The MFP 1 functions as a copying machine, a scanner, a printer or a network communication device.

The scanner 8 reads out an image on a document surface as color image data or monochrome image data. The scanner 8 optically scans the document surface to thereby read out the image on the document surface.

Figure 2:
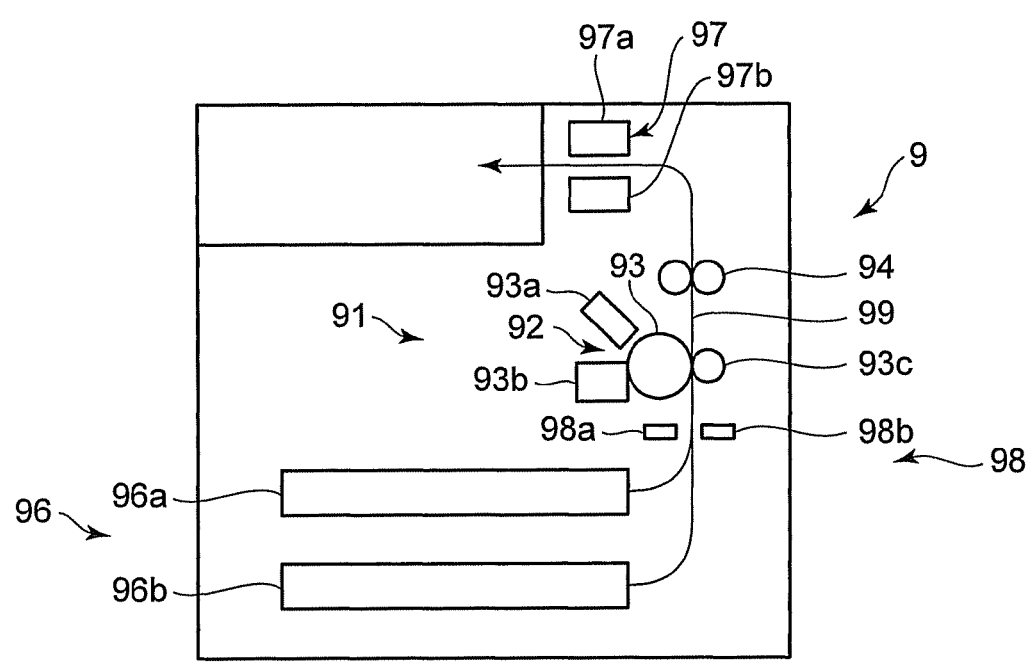
FIG. 2 is a schematic configuration diagram showing a printer of the first embodiment.

As shown in FIG. 2, for example, the printer 9 includes a decoloring image forming unit 91 that is a first image forming unit to perform image forming processing with erasable coloring agent, and a non-decoloring image forming unit 97 that is a second image forming unit to perform image forming with unerasable coloring agent. The decoloring image forming unit 91 is a device to perform image forming with an electrophotographic system. The decoloring image forming unit 91 forms a discrimination information image corresponding to the discrimination information of a sheet. The decoloring image forming unit 91 includes an image forming station 92, a fixing unit 94, a sheet supply unit 96, a sheet supply scanner 98 serving as a discrimination information image discriminating unit, and a conveying portion 99, and so on.

The image forming station 92 includes an exposure unit 93a, a developing unit 93b and a transferring unit 93c around a photoconductive drum 93. The exposure unit 93a forms an electrostatic latent image corresponding to the image on the photoconductive drum 93. The developing unit 93b using decoloring toner that is erasable coloring agent develops the electrostatic latent image formed on the photoconductive drum 93 to thereby visualize the image. The decoloring toner is fixed on the sheet at a comparatively low temperature such as about 80 to 100° C., and is decolored at a comparatively high temperature, such as 180 to 200° C.

The sheet supply unit 96 includes a first sheet cassette 96a to supply a reuse sheet from which the image has been decolored, and a second sheet cassette 96b to supply a new unused sheet. The sheet supply unit 96 gives priority to the first sheet cassette 96a, for example, and supplies a sheet thereto. The sheet supply scanner 98 includes a first sheet supply scanner 98a and a second sheet supply scanner 98b. The first sheet supply scanner 98a and the second sheet supply scanner 98b read out a QR code, for example, on the reuse sheet. The transferring unit 93c transfers a visualized toner image on the photoconductive drum 93 on a reuse sheet or a new sheet supplied from the sheet supply unit 96. The fixing unit 94 to fix the image by heating the unfixed toner image formed on the sheet at about 80 to 100° C., for example, and by applying pressure to it.

The non-decoloring image forming unit 97 is a unit to perform image forming using ink that is unerasable coloring agent with an ink jet system. The non-decoloring image forming unit 97 includes a first print head 97a and a second print head 97b. The non-decoloring image forming unit 97 performs image forming processing for the image data which is obtained as an image forming job. The non-decoloring image forming unit 97 sets ink corresponding to the image data from the first print head 97a and the second print head 97b to thereby form an image with the ink on a sheet. The conveying portion 99 conveys the sheet set in the sheet supply unit 96. In addition, the conveying portion 99 outputs the sheet having the image as a print result.

In addition, the printer 9 is not limited to this, but performs image forming using non-decoloring toner with an electrophotographic system. Or, the printer 9 may perform image forming using erasable coloring agent with a printing system such as an ink jet system or a thermal transfer system.

The operation panel 7 is a user interface. The operation panel 7 includes various operation buttons and a display unit 7a with a built-in touch panel, for example. The operation panel 7 functions as an operating unit for a user to input an operation instruction and a display unit to display guides and so on to a user. The finisher 9a performs finishing processing of the sheets on which the image is formed, such as ejection, sorting and stapling of the sheets.

Next, the decoloring device 6 will be described.

Figure 3:
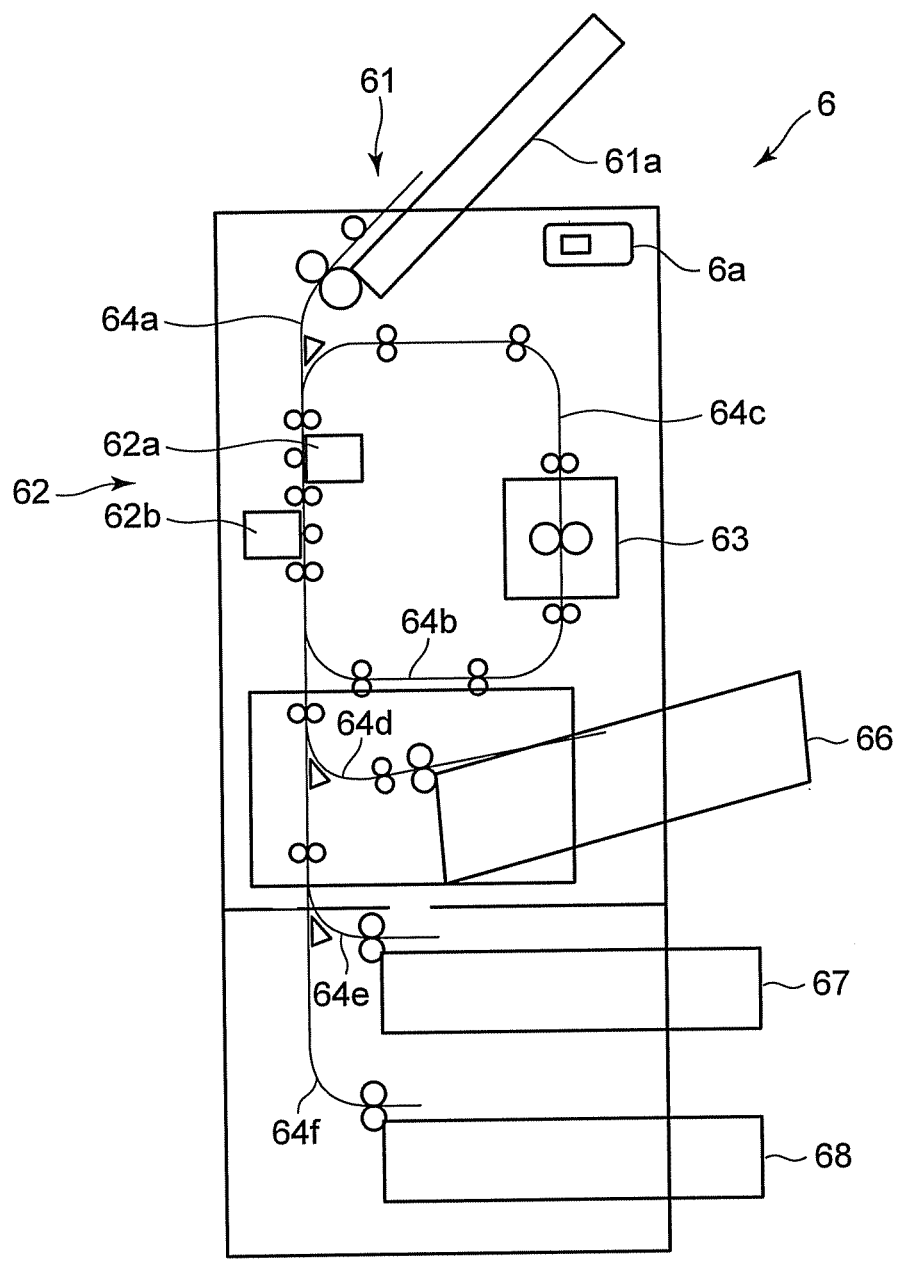
FIG. 3 is a schematic configuration diagram showing a decoloring device of the first embodiment.

As shown in FIG. 3, the decoloring device 6 includes an operation panel 6a provided with operation buttons and a display unit, a sheet supply unit 61, a scanner 62 that is a reader for reuse, a decoloring unit 63, a first conveying portion 64a, a second conveying portion 64b, a third conveying portion 64c, a fourth conveying portion 64d, a fifth conveying portion 64e, a sixth conveying portion 64f, a first eject tray 66, a second eject tray (a reject box) 67 and a third eject tray (a security box) 68. The decoloring device 6 is provided with a network communication function. For example, the decoloring device 6 handles the sheet depending on the security level requested from the print server 2.

The first conveying portion 64a conveys a sheet from a sheet supply tray 61a of the sheet supply unit 61 to the scanner 62. The second conveying portion 64b conveys the sheet from the scanner 62 to the decoloring unit 63. The third conveying portion 64c conveys the sheet from the decoloring unit 63 to the scanner 62 again. The fourth conveying portion 64d conveys the sheet from the scanner 62 to the first eject tray 66. The fifth conveying portion 64e conveys the sheet from the scanner 62 to the reject box 67. The sixth conveying portion 64f conveys the sheet from the scanner 62 to the security box 68.

The first eject tray 66 recovers the sheet which is reusable after the image has been decolored, for example. The reject box 67 recovers the sheet which is not reusable and is normally to be disposed for recycling processing. The security box 68 is a box with a key and a password, and recovers the sheet having high security and requiring a separate processing (security disposition). Regarding the sheet recovered in the security box 68, a person in charge who is authorized to deal with the key and the password performs security disposition, such as shredding processing of the sheet with a shredder or dissolution treatment, to thereby keep the security of the image data of the image on the sheet.

The decoloring device 6, (1) reads out a sheet which is supplied from the sheet supply unit 61 by the first conveying portion 64a by the scanner 62. The scanner 62 includes a first scanner 62a and a second scanner 62b, and reads out both surfaces of the sheet.

(2) The scanner 62 reads out the print status of the sheet and a discrimination information image. (3) The decoloring device 6 performs recognition of the discrimination information from the discrimination information image which has been read out by the scanner 62, storing of the image data, and so on. In addition, the sheet with a high security level recognized from the discrimination information image is recovered in the security box 68 by the sixth conveying portion 64f. Furthermore, the decoloring device 6, in case that break or ruck is present in the sheet recognized from the print status read out by the scanner 62, conveys the sheet to the reject box 67 by the fifth conveying portion 64e. The sheet in which break or ruck is not present is conveyed to the decoloring unit 63 by the second conveying portion 64b.

(4) The decoloring unit 63 decolors the image on the passing sheet with heat. The decoloring unit 63 decolors the image of the sheet which has been formed with erasable coloring agent by heating and pressurizing the sheet at a relatively high temperature of 180 to 200° C., for example. (5) The sheet which has passed through the decoloring unit 63 is conveyed again to the scanner 62 by the third conveying portion 64c. The scanner 62 reads out again the print status in order to confirm whether the image formed on an image region with erasable coloring agent has surely been decolored. (6) The sheet from which the image formed with erasable coloring agent has surely been decolored recognized from the print status read out by the scanner 62 is conveyed to the first eject tray 66 by the fourth conveying portion 64d. In case that the image formed with unerasable coloring agent or an image written by hand remains on the image region recognized from the print status read out by the scanner 62, or in case that break or ruck is generated as a result that the sheet is passed through the decoloring unit 63, such a sheet is conveyed to the reject box 67 by the fifth conveying portion 64e.

In addition, the decoloring device 6 is not limited to a device which decolors an image with heat. The decoloring device decolors an image with light or decolors an image through chemical reaction depending on the erasable coloring agent, for example.

Figure 4:
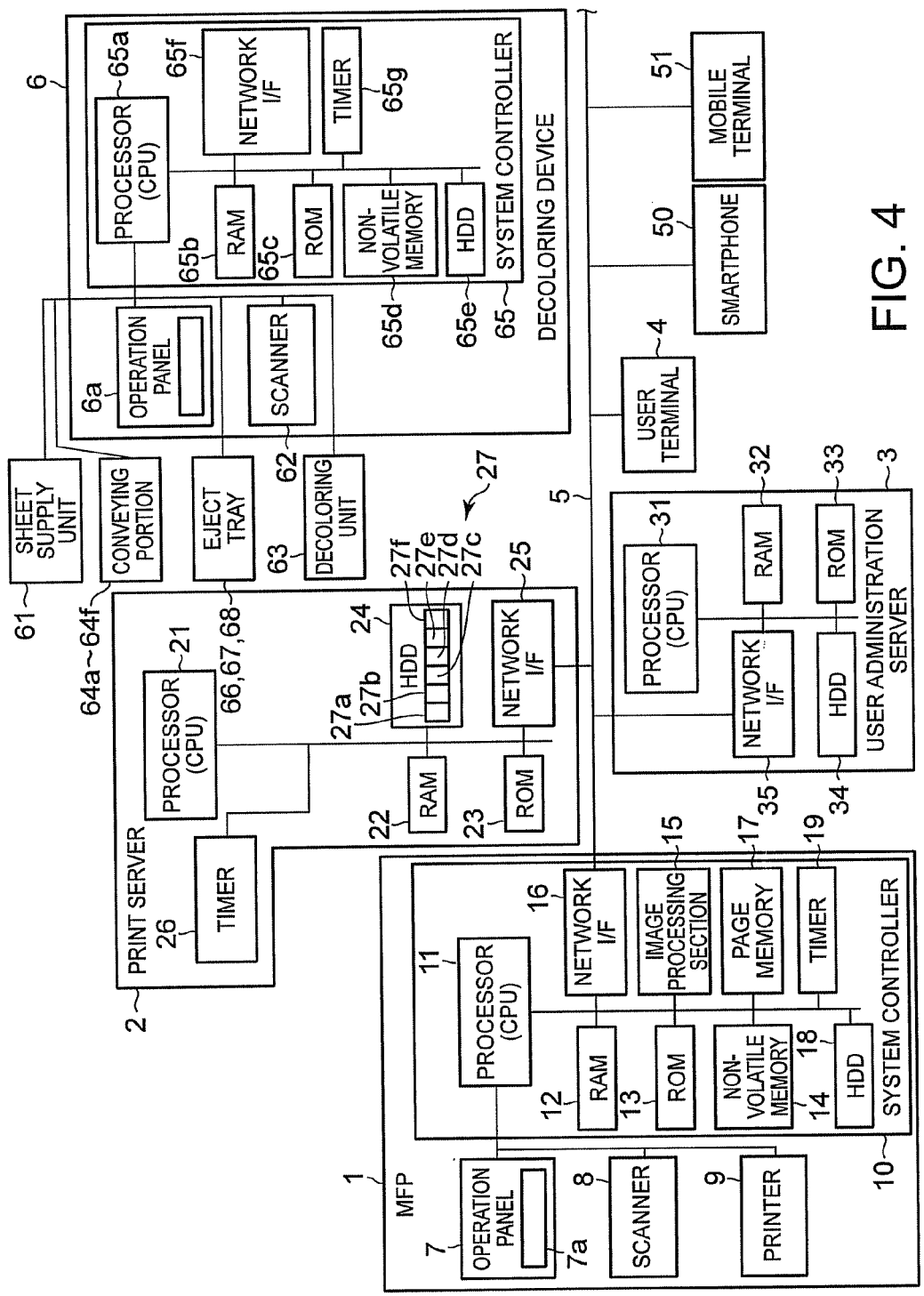
FIG. 4 is a schematic block diagram showing a configuration example composed mainly of a control system of the MFP and the decoloring device of the document administration system of the first embodiment.

Next, a configuration which is mainly composed of a control system of the MFP 1 and the decoloring device 6 of the document administration system 100 will be described with reference to FIG. 4.

The MFP 1 has a system controller 10 which totally controls each unit. The system controller 10 controls the scanner 8, the printer 9 and the operation panel 7, for example. The system controller 10 obtains information from the operation panel 7, the print server 2 and the user administration server 3 connected through the local area network 5, and further obtains information which a user or an administrator has inputted from the user terminal 4, the smartphone 50 and the mobile terminal 51. The system controller 10 includes a processor 11 that is a CPU, for example, a random access memory (RAM) 12, a read only memory (ROM) 13, a nonvolatile memory 14, an image processing section 15, a network interface (I/F) 16, a page memory 17, a hard disk drive (HDD) 18 and a timer 19, and so on.

The processor 11 executes the control program stored in the ROM 13, the nonvolatile memory 14 or the HDD 18 to thereby put various processing functions into practice. The RAM 12 is a main memory which functions as a working memory. The ROM 13 stores a control program to control the operation of the MFP 1 and control data and so on. The nonvolatile memory 14 is a rewritable nonvolatile memory. The nonvolatile memory 14 stores a control program so as to put various processing functions into practice and control data. The nonvolatile memory 14 holds setting information, for example.

The image processing section 15 performs image processing of the image data read out by the scanner 8 or the image data received through the network. The network interface (I/F) 16 is an interface to communicate with the external device through the local area network 5. The page memory 17 is a memory with a memory area in which the image data of at least one page can be expanded. The HDD 18 is a mass storage memory for data storage. The HDD 18 accumulates image data to be printed. The timer 19 adjusts the timing of the system of the MFP 1.

The print server 2 includes a processor 21 that is a CPU, for example, a RAM 22, a ROM 23, an HDD 24 serving as an information memory unit, a network interface (I/F) 25 and a timer 25.

The processor 21 controls the whole of the print server 2. The processor 21 executes the program stored in the ROM 23 or the HDD 24 to thereby put various processing functions into practice. The processor 21 is provided with processing function to administer images and to administer the sheets in the document administration system 100. The processor 21 executes the program to thereby put the processing function into practice. The RAM 22 is a working memory. The ROM 23 stores a control program to control fundamental operation of the print server 2 and control data and so on. The network interface 25 is an interface to perform data communication with each device in the local area network 5. The HDD 24 is a memory for data storage. The HDD 24 is provided with an administration table 27 to administer images to be printed in the whole document administration system 100.

The user administration server 3 includes a processor 31 that is a CPU, for example, a RAM 32, a ROM 33, an HDD 34, and a network interface (I/F) 35.

The processor 31 controls the whole of the server 3. The processor 31 executes the program stored in the ROM 33 or the HDD 34 to thereby put various processing functions into practice. The RAM 32 is a working memory. The ROM 33 stores a control program to control fundamental operation of the server 3 and control data and so on. The HDD 34 is a memory for data storage. The HDD 34 stores data for user authentication, for example. The network interface 35 is an interface to perform data communication with each device in the local area network 5.

In the user administration server 3, the processor 31 is provided with user authentication function. The user authentication function authenticates a user. The user authentication function obtains user information such as a user ID or a password which a user has inputted from the operation panel 7 of the MFP 1. The user authentication function cross-checks the user information obtained from the MFP 1 with the data for user authentication stored in the HDD 34 to thereby determine the feasibility of the authentication. In addition, the MFP 1, the user terminal 4, the decoloring device 6 and so on may read out the user information used for the user authentication from an IC card which a user has.

In addition, the MFP 1 or the print server 2 may be provided with all or a part of the functions provided in the user administration server 3. The processor 11 of the MFP 1 or the processor 21 of the print server 2 may put the user authentication function into practice, for example. The data for user authentication may be stored in the HDD 18 of the MFP 1 or the HDD 24 of the print server 2.

In addition, the MFP 1 or the user administration server 3 may be provided with all or a part of the functions provided in the print server 2. The processor 11 of the MFP 1 or the processor 31 of the user administration server 3 may put each of the functions into practice which the processor 21 puts into practice by executing the program, for example. In addition all or a part of the information stored in the administration table 27 may be stored in the HDD 18 of the MFP 1 or the HDD 34 of the user administration server 3.

The decoloring device 6 includes a system controller 65 to totally control each unit. The system controller 65 controls the sheet supply unit 61, the scanner 62, the decoloring unit 63, the first to sixth conveying portions 64a-64f, the first to third eject trays 66-68 and the operation panel 6a, for example. The system controller 65 obtains information from the operation panel 6a, the print server 2 and the user administration server 3 connected through the local area network 5, and further obtains information which a user or an administrator has inputted from the user terminal 4, the smartphone 50 and the mobile terminal 51. The system controller 65 includes a processor 65a that is a CPU, for example, a random access memory (RAM) 65b, a read only memory (ROM) 65c, a nonvolatile memory 65d, a hard disk drive (HDD) 65e, a network interface (I/F) 65f and a timer 65g and so on.

The processor 65a executes the control program stored in the ROM 65c, the nonvolatile memory 65d or the HDD 65e to thereby put various processing functions into practice. The RAM 65b is a main memory which functions as a working memory. The ROM 65c stores a control program to control an operation of the decoloring device 6 and control data and so on. The nonvolatile memory 65d is a rewritable nonvolatile memory. The nonvolatile memory 65d stores a control program to put various processing functions into practice and control data. The nonvolatile memory 65d holds judgment level information to judge whether a sheet is to be reused or rejected and information of the setting temperature of the decoloring unit 63.

The HDD 65e is a mass storage memory for data storage. The HDD 65e accumulates comparison data with the scanned result, for example. The network interface (I/F) 65f is an interface to communicate with the external device through the local area network 5. The timer 65g adjusts timing of the system of the decoloring device 6.

Hereinafter, printing an image on a sheet and the administration of the sheet on which the image is printed in the document administration system 100 will be described.

The document administration system 100 is able to limit printing the image or copying based on the discrimination information. The document administration system 100 is able to limit the processing of the sheet on which the image is printed based on the discrimination information. The discrimination information is connected to administration information, such as, time and date of printing the image, a person to print the image, a machine to print the image, security setting of the image, expiration date of the image, kind of coloring agent of the printed or copied image (whether or not it is erasable coloring agent), generation information of the image, number of uses of a sheet, machine history and so on.

Each time the document administration system 100 newly creates a document (image), issues a document ID that is information to discriminate the created document (image), and in case that the newly created document (image) is printed or copied, the document administration system 100 issues a print ID as the "discrimination information". The print ID is connected to the document ID. The print ID is information which is convertible into code information such as a two-dimensional bar code or a QR code. The document administration system 100 prints a code made by imaging the print ID on a sheet. In this embodiment, each time an image is printed or copied on an unused sheet, a QR code is printed on the sheet at a prescribed position with non-decoloring ink, for example. In addition, the QR code may include related information other than the print ID.

The document administration system 100 administers various administration information such as image data which is connected to a QR code (print ID) in the print server 2. The document administration system 100 obtains administration information from the print ID obtained from the QR code printed on the sheet, and puts the administration of, such as printing, copying, scanning, and data creation of the image into practice, and thereby puts the administration of the sheet on which the image is printed into practice.

In case that a document (image) is newly created in the user terminal 4 and so on, and the newly created document (image) is firstly printed or copied on a unused sheet, the MFP 1 prints a document (image) connected to a new document ID on a new sheet. The MFP 1 prints the document (image) on an image region of the sheet, and in addition, prints a QR code made by imaging a print ID which is further issued in connection with the new document ID on a non-image region of the sheet at a prescribed position, for example.

The document (image) connected to the document ID is printed by any of the decoloring image forming unit 91 or the non-decoloring image forming unit 97 depending on an instruction of a user. The QR code is printed using non-decoloring ink in the non-decoloring image forming unit 97. The non-decoloring image forming unit 97 does not print the QR code on a reuse sheet on which a QR code has been printed already. In case that the MFP 1 prints a document (image), the sheet supply scanner 98 reads out the QR code and detects that the sheet is a reuse sheet, the MFP 1 prints only the document (image) on the sheet on the print image region, and the non-decoloring image forming unit 97 does not print the QR code on the non-image region.

A sheet is administered by a firstly printed QR code from the start of using the sheet till reuse by decoloring, recycle or security disposition of the sheet. In addition, every time a document (image) is formed on a reuse sheet, the information of the reuse sheet is added to a print ID issued for the formed document (image) as the administration information.

In case that the document administration system 100 reads out the QR code along with the document (image) printed on the sheet by the scanner 8, adds further new administration information or new sheet information which is newly obtained by reading by the scanner 8 to the administration information or the sheet information which has been stored already in the print server 2.

An example of administration information controlled by the QR code in connection with a print ID (QR code) which is issued in case that the document administration system 100 creates a new document (image), and an example of administration information added in connection with the print ID (QR code) in case that the document (image) is read out by the scanner 62 in order to decolor the printed document (image) by the decoloring device 6 are shown in FIG. 5.

In case that a new document (image) is created (at the time of creating an initial stage document (image)), or in case that a document (image) is printed or copied (at the time of printing), administration information which is given in connection with the print ID (QR code) includes a company name, a division one belongs to/a floor/an area, a creator, a print machine, print time and date, a security level, a decoloring acceleration level, an original data reference location (directory), print coloring agent attribute/a fixing temperature/a transfer voltage, and a decoloring temperature of print coloring agent and so on, for example.

In case that the document (image) is read by the scanner 62 in order to decolor the document (image), administration information which is added in connection with the print ID (QR code) includes a reading machine, reading time and date, decoloring time and date, number of decoloring times, a decoloring temperature, data information at the time of decoloring, conversion of read data into PDF, PDF electronic data, a difference (difference administration from original data for each generation information), OCR processing of read data, OCR electronic data, and OCR translation data, and so on, for example.

Figure 6:
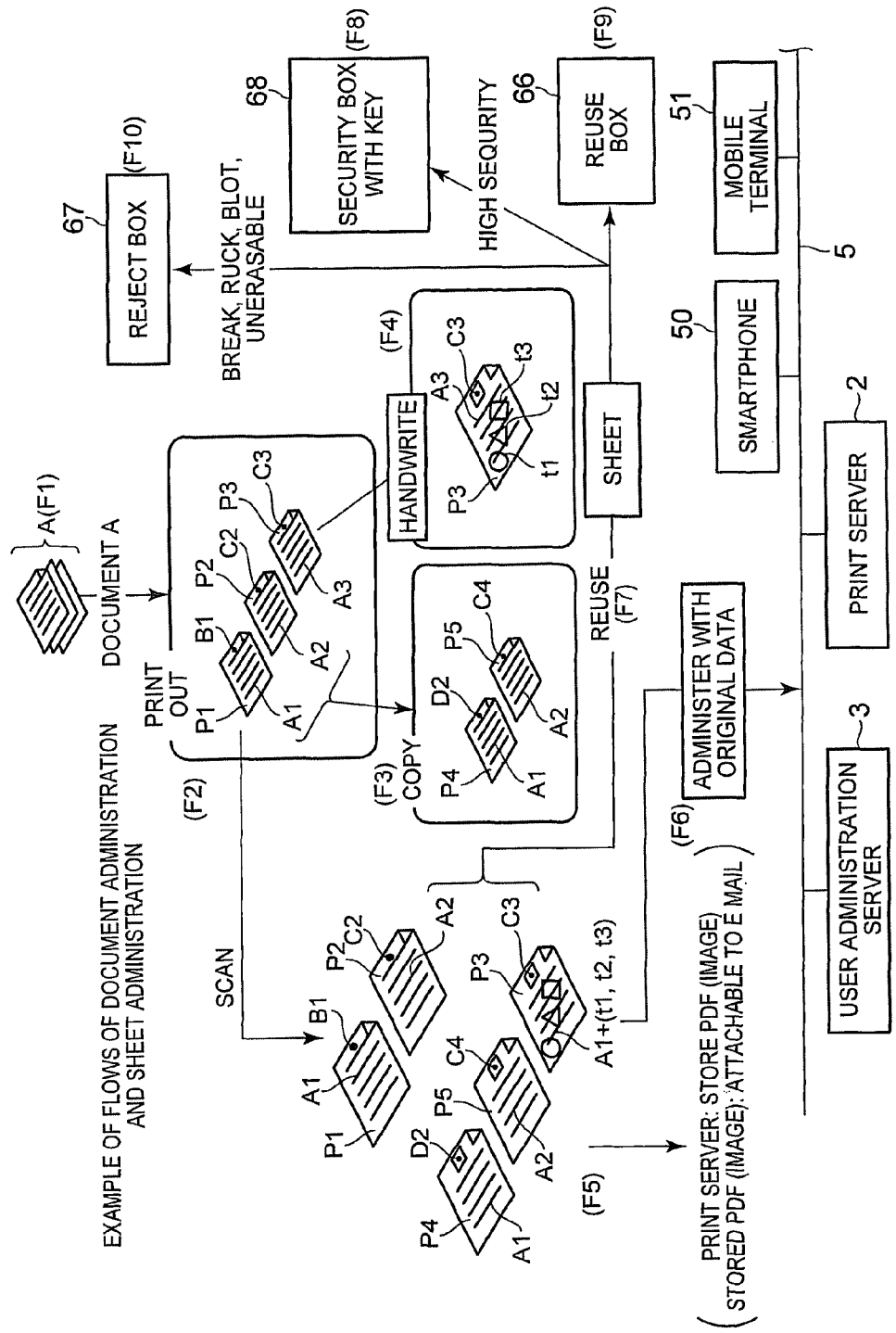
FIG. 6 is an explanatory diagram showing flows of the document (image) administration and sheet administration by the document administration system of the first embodiment.

Next, an example of a flow of the document (image) administration and the sheet administration which the document administration system 100 puts into practice using a print ID (QR code) will be described with reference to FIG. 6. In (F1), a user creates a document A that is a new document (image) composed of three pages by the user terminal 4. The print server 2 issues a document ID to the document A, and issues a new print ID for each page of the document A in connection with the document ID. The print server 2 stores the administration information shown in FIG. 5 and so on in the administration table 27 of the HDD 24, for example, in connection with each document ID and each of the print IDs thereof.

In case that the MFP 1 prints the document A in (F2), when a reuse sheet supplied from the first sheet cassette 96a is used, since the QR code has been printed on the reuse sheet, the print server 2 does not supply QR code information (QR code image) which is made by imaging the print ID to the MFP 1. In case that the MFP 1 prints the document A, when an unused sheet supplied from the second sheet cassette 96b is used, the print server 2 converts the print ID for the image of each page into QR code information (QR code image) made by imaging each print ID and supplies it to the MFP 1.

In case that a first page of the document A is printed on a reuse sheet P1, the MFP 1 prints the document (image) on an image region by the decoloring image forming unit 91 or the non-decoloring image forming unit 97. The document (image) A1 is printed on the image region of the sheet P1 having QR code B1 printed on the non-image region at the time of first use.

In case that a second page and a third page of the document A are printed on unused sheets P2, P3, respectively, the print server 2 supplies QR code information C2, C3 to the MFP 1 corresponding to print IDs for the respective images of documents A2, A3 to be printed. The MFP 1 prints the documents (images) A2, A3 on image regions of the sheets P2, P3, respectively, by the decoloring image forming unit 91 or the non-decoloring image forming unit 97, and prints the QR codes C2, C3 on the reference positions of the non-image regions of the sheets P2, P3 with non-decoloring ink by the non-decoloring image forming unit 97, respectively. On the unused sheet P2, the document (image) A2 is printed on the image region and the QR code C2 is printed upper right on the non-image region. On the unused sheet P3, the document (image) A3 is printed on the image region and the QR code C3 is printed upper right on the non-image region.

The print server 2, in connection with the print ID of the first page, additionally stores the QR code B1 so as to administer that the document is printed on the reuse sheet P1 and the number of generations (the number of times of printing) as further administration information in the administration table 27. The print server 2 additionally stores the respective numbers of generations (the respective numbers of times of printing) in connection with the prints ID of the second and third pages as further administration information in the administration table 27.

Next, in (F3), in the case of copying the sheet P1 and the sheet P2, the MFP 1 scans the sheet P1 and the sheet P2 by the scanner 8, for example, and converts the images of the sheet P1 and the sheet P2 into scan image data. The MFP 1 transfers the scan image (the image of the sheet P1 and the image of the sheet P2) data to the print server 2. The print server 2 extracts the respective QR code information (B1, C2) from the scan images of the sheet P1 and the sheet P2. The print server 2 determines print IDs of the respective documents (images) A1, A2 from the extracted QR code information.

The print server 2 confirms the administration information connected to the determined print IDs in the administration table 27 to thereby judge whether or not the sheet P1 and the sheet P2 can be copied. When that the sheet P1 and the sheet P2 can be copied is judged, the print server 2 adds new administration information such as the number of generations (the number of times of printing), copy condition and so on to the administration information connected to the two print IDs to thereby update the administration table 27.

In case that the MFP 1 copies the sheet P1, when a reuse sheet P4 having a QR code D2 is used, the print server 2 does not supply the QR code information (QR code image) made by imaging the QR code B1 in connection with the print ID of the document (image) A1 to the MFP 1. The MFP 1 copies only the document (image) A1 on the image region of the sheet P4 having the QR code D2 on the non-image region by the decoloring image forming unit 91 or the non-decoloring image forming unit 97.

In case that the MFP 1 copies the sheet P2, when a unused sheet P5 supplied from the second sheet cassette 96b is used, the print server 2 supplies new QR code information (QR code image) which is made by imaging the QR code C2 in connection with the print ID of the document (image) A2 to the MFP 1. The MFP 1 prints the document (image) A2 on the image region of the sheet P5 by the decoloring image forming unit 91 or the non-decoloring image forming unit 97, and prints a new QR code C4 upper right on the non image region of the sheet P5 with the non-decoloring ink by the non-decoloring image forming unit 97.

The print server 2, in connection with the print ID of the document (image) A1, additionally stores the QR code D2 so as to administer that the document is printed on the reuse sheet P4 and the number of generations (the number of times of printing) as further administration information in the administration table 27. The print server 2, in connection with the print ID of the document (image) A2, additionally stores the new QR code C4 and the number of generations (the number of times of printing) as further administration information in the administration table 27.

In (F4), a user writes handwritten memos t1, t2, t3 which are not erasable by heat on the sheet P3 with a ballpoint pen or the like.

Figure 7:
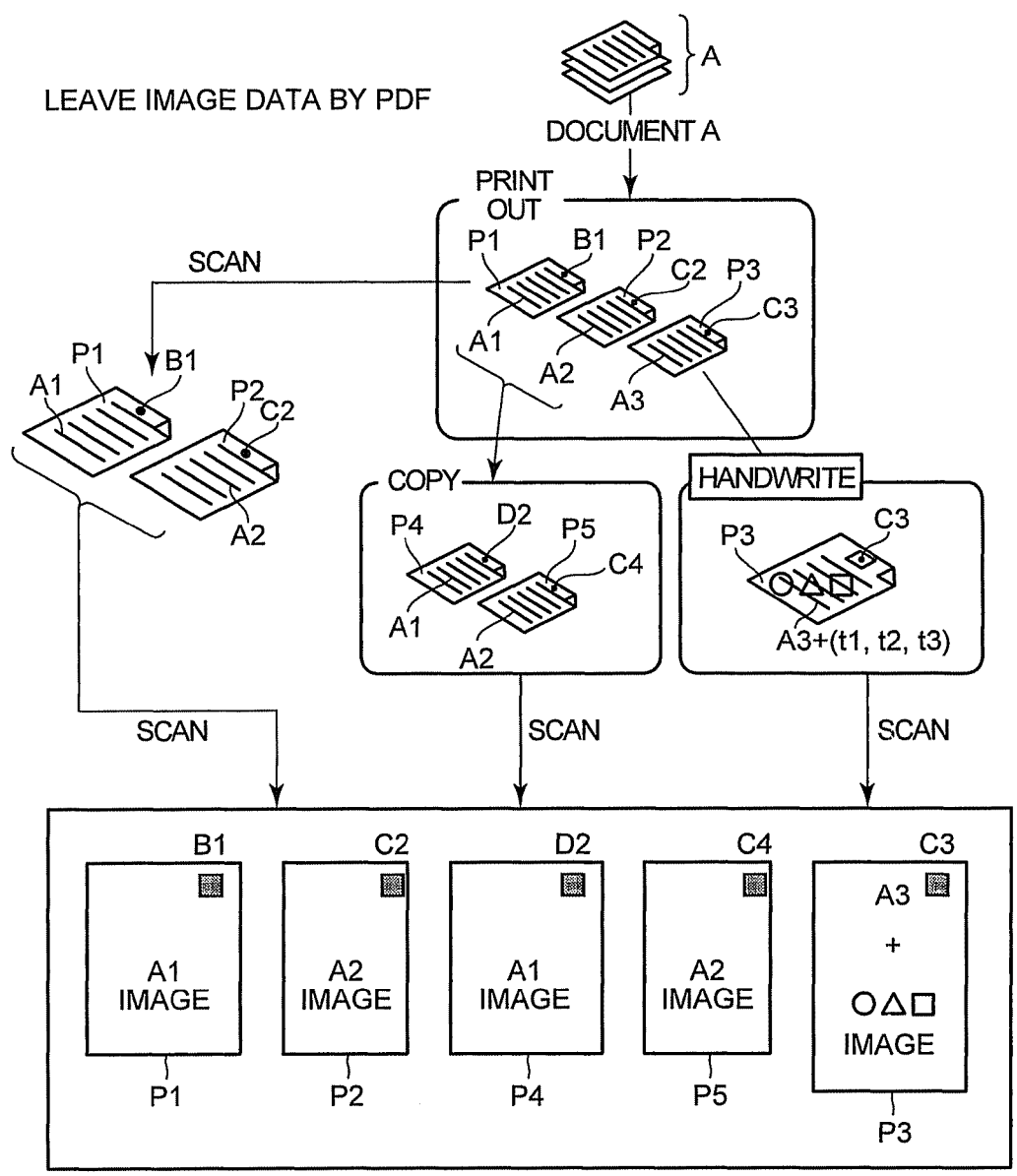
FIG. 7 is an explanatory diagram showing a case to leave the scanned image data as an image by the document administration system of the first embodiment.

Next, in (F5), the MFP 1 scans the sheets P1, P2, P4, P5 and the sheet P3 on which the handwritten memos t1, t2, t3 are written, and leaves the information in the form of PDF (image). As shown in FIG. 7, the MFP 1 scans the sheets P1, P2, P4, P5 and the sheet P3 by the scanner 8, for example, to thereby convert the images into scan image data. The MFP 1 transfers the scan image data to the print server 2. The print server 2 extracts the QR code information (B1, C2, D2, C4, C3) from the scan images, respectively. The print server 2 determines the print IDs of the documents (images) A1, A2, A3, from the extracted QR information, respectively.

The print server 2 confirms the administration information connected to the determined print IDs in the administration table 27 to thereby judge whether or not the image data are convertible to PDF. When that the documents (images) A1, A2, A3 are convertible to PDF is judged, the print server 2 permits the user terminal 4, for example, to convert them into PDF. The print server 2 adds new administration information, such as a condition of conversion to PDF, to the administration information connected to the respective print IDs, to thereby update the administration table 27. For example, a user can obtain image data in the form of PDF from the user terminal 4 and can attach the image data to an e-mail. After the images are converted into PDF, the sheets P1, P2, P4, P5 and the sheet P3 are decolored for reuse in (F7), for example.

Figure 8:
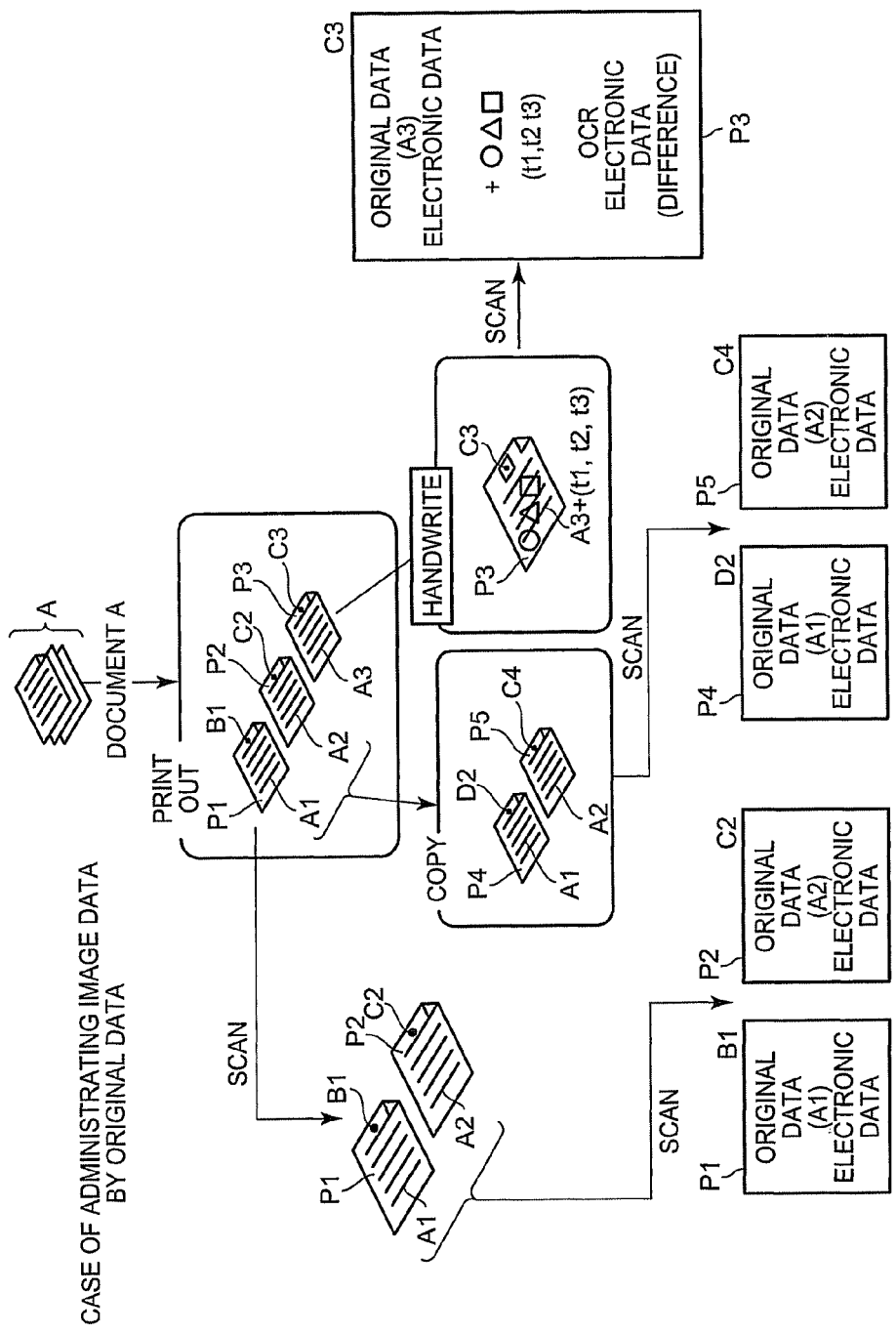
FIG. 8 is an explanatory diagram showing a case to leave the scanned image data as original data by the document administration system of the first embodiment.

(F6) does not convert the scanned image data into PDF, but administers the scanned image data in the form of the original data. As shown in FIG. 8, the MFP 1 scans the sheets P1, P2, P4, P5 and the sheet P3 on which the handwritten memos t1, t2, t3 are written, and converts the images into scan image data. The MFP 1 transfers the scan image data to the print server 2. The print server 2 extracts the QR code information (B1, C2, D2, C4, C3) from the scan images, respectively. The print server 2 determines the print IDs of the documents (images) A1, A2, A3 from the extracted QR code information, respectively.

The print server 2, in connection with the determined IDs, compares the original data (A1, A2, A3) stored in the administration table 27 with the scan image data. Since the scan image data (A1, A2) of the sheets P1, P2, P4, P5 are not different from the original data, but are the same as the original data, the scan image data is administered by the electronic data of the original data. The print server 2 adds new administration information such as the QR codes B1, C2, D2, C4 of the scanned sheet P1, P2, P4, P5 to the administration information connected to the print IDs of the documents (images) A1, A2 of the original data, to thereby update the administration table 27.

The print server 2 compares the original data (A3) stored in the administration table 27 in connection with the print ID determined from the QR code information C3 obtained by scanning the sheet P3 on which the handwritten memos t1, t2, t3 are written, with the scan image data of the sheet P3 on which the handwritten memos t1, t2, t3 are written. With respect to the scan image data of the sheet P3, the OCR electronic data of the handwritten memos t1, t2, t3 becomes a difference from the original data A3. The print server 2 newly adds the OCR electronic data of the difference to the administration table 27 to thereby update the administration table 27, so that the data of the handwritten memos t1, t2, t3 is added for storing to the original data of the administration information connected to the print ID of the document (image) A3 of the original data. The scanned sheets P1, P2, P4, P5 and the sheet P3 are decolored for reuse in (F7), for example.

After the sheets are scanned in (F5) or (F6), the user decolors the sheets P1, P2, P4, P5 and the sheet P3 for reuse in (F7). The user sets the sheets P1, P2, P4, P5, P3 on the sheet supply tray 61a of the decoloring device 6. When the user instructs to start the decoloring operation by the operation panel 6a, the first conveying portion 64a conveys the sheets P1, P2, P4, P5, P3 to the scanner 62 in sequence. The scanner 62 scans the print statuses of the sheets P1, P2, P4, P5, P3 and the QR codes B1, C2, D2, C4, C3, respectively. The print server 2' extracts the QR code information from the scan images of the QR codes B1, C2, D2, C4, C3, respectively. The print server 2 determines print IDs of the images from the extracted QR code information, respectively.

The print server 2 confirms security levels connected to the respective determined print IDs in the administration table 27. For example, in case that security disposition to surely dispose a sheet is required for the sheets P1, P4 judged from the security levels, the sixth conveying portion 64f conveys the sheets P1, P4 to the security box 68 with a key or a password. The sheet P4 recovered in the security box 68 is security disposed. The print server 2 adds the disposition processing of the sheets P1, P4 as new administration information to the administration information connected to the print IDs extracted from the QR codes B1, D2 of the sheets P1, P4 and determined, to thereby update the administration table 27 (F8).

In case that the sheets P2, P5, P3 are reused from the security levels, if break or ruck is not present in the sheet from the print status, the second conveying portion 64b conveys the sheets P2, P5, P3 to the decoloring unit 63. The decoloring unit 63 heats the sheets P2, P5, P3 in sequence to thereby decolor the images. The third conveying portion 64c conveys the sheets P2, P5, P3 again to the scanner 62 in order to confirm whether the images of the sheets P2, P5, P3 have been surely decolored. The sheets P2, P5 from which the images have been surely decolored from the print statuses read by the scanner 62 are conveyed to the first eject tray 66 by the fourth conveying portion 64d and are reused. The sheet P3 on which the handwritten memos t1, t2, t3, for example, are not erased and remaining from the print status read by the scanner 62 is conveyed to the reject box 67 by the fifth conveying portion 64e and is recycle processed.

The print server 2 adds the reuse of the sheets P2, P5 as new administration information to the administration information connected to the print IDs which are extracted from the QR codes C2, C4 of the sheets P2, P5 and determined, to thereby update the administration table 27 (F9). The print server 2 adds the recycle processing of the sheet P3 as new administration information to the administration information related to the print ID which is extracted from the QR code C3 of the sheet P3 and determined, to thereby update the administration table 27 (F10).

Next, the administration table 27 to store information including the example of the administration information which is controlled by the QR code shown in FIG. 5 will be described with reference to FIG. 9. The administration table 27 includes a document (image) memory area 27a to store information related to a document (image) (manuscript) to be printed shown in FIG. 9(a), a page memory area 27b to store information related to each page of the document (image) (manuscript) to be printed shown in FIG. 9(b), a print data area 27c to store information related to an image which is printed or copied shown in FIG. 9(c), an operation log memory area 27d to store information related to an operation log shown in FIG. 9(d), an acceptable amount memory area 27e to store information related to an amount of usable sheets shown in FIG. 9(e), and a used amount memory area 27f to store information related to a used amount of sheets shown in FIG. 9(f).

The document (image) memory area 27a stores a file name, the number of pages of the document (image) (manuscript) in connection with a document ID issued in case that a new document (image) (manuscript) is created, for example, and further stores, in master data, master data (a company name, division one belongs to/a floor/an area, a creator, a security level, a decoloring acceleration level, original data (in case that the original data itself is not stored, an original data reference location (directory)) and so on). The file name is a name as electronic data of the document (image) (manuscript). The number of pages is a total number of pages of the images composing the document (image). The master data is image data to form a master of each of the page images composing the document (image).

The page memory area 27b stores information related to (individual image) in connection with the document ID, and further corresponding to a created page ID which is information so as to discriminate an image for each page of a document (image). The page memory area 27b stores a page number, a security level, an expiration date, an output flag, and so on, for example. The document ID is common in the document (image) memory area 27a and the page memory area 27b.

In case that the document administration system 100 registers a new document (image) in the administration table 27, issues a page ID, and registers the information related to each page of the document (image) in the administration table 27. The security level indicates security setting for the image of the relevant page. For example, any one of a level 1 (lowest) to a level 5 (highest) in the order of ascending security degrees is set as the security level. A user may set this security level at the time of creating a document (image), or an administrator may set this later. The security level is information indicating authority to print (copy), decolor and create data and so on for the image of the relevant page. The expiration date is information indicating an expiration date of printing (copying) and so on for the image of the relevant page. A user may register the expiration date, or an administrator may set the expiration date. The output flag is a flag indicating whether or not printing and copying are permissible for the relevant page.

The print data area 27c, in connection with the page ID and further corresponding to a created print ID, stores a print ID of one generation before, the number of generations, a decoloring flag, a user ID and so on. In addition, the print data area 27c stores the information related to print processing, such as an attribute/a fixing temperature/a transfer voltage of print coloring agent, a decoloring temperature of the print coloring agent. The page ID is common in the page memory area 27b and the print data area 27c.

The print ID discriminates a single print processing for an image of one page. The print ID of one generation before is a print ID at the time of the previous print processing for the print processed image. The number of generations is the accumulated number of times of printing for the image of the page which has been printed by the relevant print processing. The page ID indicates a page of the printed image. The user ID is the information to discriminate a user who has performed the relevant print processing. The attribute of the coloring agent indicates whether or not the printed image can be decolored. The decoloring flag is a flag to indicate whether or not the print result (sheet) is decolored. In addition, the decoloring flag is updated by the decoloring flag registration processing to register the decoloring of a sheet.

The operation log memory area 27d stores information indicating an operation history (operation log) by a user, such as a time and date, an operation content, a size and so on, in connection with the print ID (user ID). In addition, the operation log memory area 27*d* stores a machine and so on.

The time and date is information indicating a time and date when an operation (processing) is executed. The user ID is information to identify a user who has executed the operation (processing). The operation content (processing content) is information indicating the content of the executed operation (processing). As the operation content (processing content), print, copy, scan, decolor, recycle, security disposition processings and so on are registered. The size is information indicating a size of the operated (processed) sheet. The print ID discriminates the size of the operated (processed) sheet. The machine is information to discriminate a machine which is operated (processed) and (a processing condition). The print ID is common in the print data area 27*c* and the operation log memory area 27*d*.

The acceptable amount memory area 27*e* stores, in connection with the user, ID information related to an acceptable amount of sheets which can be used for print or copy such as an office acceptable amount (sheets), a floor, an acceptable amount (sheets) by floor, a division, an acceptable amount (sheets) by area, an acceptable amount (sheets) by user.

The office acceptable amount is information indicating an acceptable amount of sheets which can be printed or copied in the whole office. The floor and the acceptable amount by floor indicate an acceptable amount of sheets which can be printed or copied in each floor. The division and the acceptable amount by division indicate an acceptable amount of sheets which can be printed or copied in each division. The user ID and the acceptable amount by user indicate an acceptable amount of sheets which can be printed or copied by each user. The administrator sets information such as the acceptable amounts stored in the acceptable amount memory area 27*e*.

The used amount memory area 27*f* stores, in connection with the user ID, information related to a used amount of sheets used by print or copy, such as, a sheet used amount (sheets), an acceptable amount (sheets), a usage rate (%) and so on. The information related to the used amount of sheets can be set for each individual or group for which the acceptable amount is set. The user ID is common in the print data area 27*c*, the operation log memory area 27*d*, the acceptable amount memory area 27*e* and the used amount memory area 27*f*.

The sheet used amount is information indicating an amount of the sheets which the corresponding user is using. The acceptable amount is information indicating an acceptable amount of sheets which the corresponding user can print or copy. The usage rate is information indicating a ratio of the used amount of sheets to the acceptable amount.

Next, copy or print processing in the document administration system 100 will be described.

The document administration system 100 shall copy, print or decolor a sheet, in order to identify a user who has performed copy or print, depending on an instruction of the user whose authentication has succeeded. The MFP 1 performs user authentication by the user administration server 3, using user information (a user ID and a password) which a user has inputted in the operation panel 7, or user information obtained from an ID card such as an IC card presented by a user.

Next, examples of copy, print and decoloring registration processing in the MFP 1 will be described.

Figure 10:
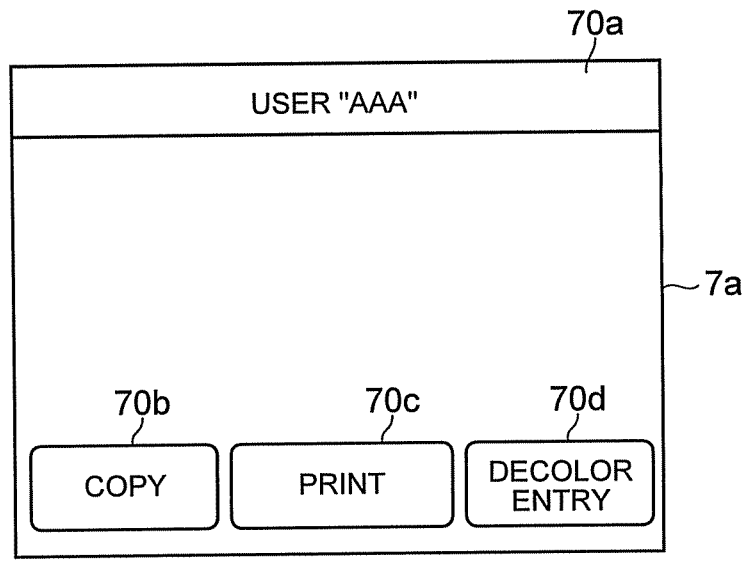
FIG. 10 is an explanatory diagram showing a display example of an operation image plane in the standby state of the first embodiment.

FIG. 10 is a diagram showing a display example of an operation image plane in a standby condition which is displayed on the display unit 7*a* of the operation panel 7 in case that the user authentication has succeeded. In the operation image plane shown in FIG. 10, the display panel 7*a* displays a user name 70*a*, a copy button 70*b*, a print button 70*c* and a decolor entry button 70*d*. A user pushes the copy button 70*b* when performing copy by the MFP 1, pushes the print button 70*c* when performing print, and pushes the decolor entry button 70*d* when decoloring a sheet.

Figure 11:
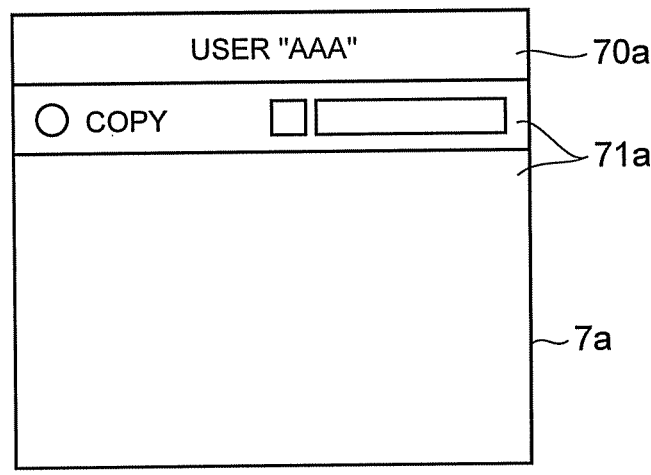
FIG. 11 is an explanatory diagram showing a display example of a copy image plane of the first embodiment.

When a user pushes the copy button 70*d*, for example, the MFP 1 displays a copy image plane 71*a* on the display unit 7*a*. FIG. 11 is a display example of the copy image plane 71*a*. A user can input various copy settings on the copy image plane 71*a* which displays the user name 70*a* shown in FIG. 11. On the copy image plane 71*a*, the user inputs copy setting and instructs start of copying. When the user instructs the start of copying, the MFP 1 starts copy processing for a document set by the user.

When a user pushes the print button 70*c*, the MFP 1 displays a print image plane 71*b* on the display unit 7*a*. FIG. 12 is a display example of the copy image plane 71*b*. On the print image plane 71*b* shown in FIG. 12, data which the relevant user can print are displayed by a list. On the print image plane 71*b*, the user specifies data to be printed and instructs start of printing. When the user instructs start of printing, the MFP 1 starts print processing for the print data specified by the user.

When a user pushes the decolor entry button 70*d*, the MFP 1 displays a decolor entry image plane 71*c* on the display unit 7*a*. FIG. 13 is a display example of the decolor entry image plane 71*c*. A user can input setting related to the decoloring processing of a sheet on the decolor entry image plane 71*c* shown in FIG. 13. The user sets a sheet to be decolored on the scanner 8 and instructs start of decolor entry on the decolor entry image plane 71*c*. When the user instructs start of the decolor entry, the MFP 1 starts decolor entry processing for the sheet set by the user. In addition, a check box and "security disposition, inevitably" are displayed so that a sheet with a high security level can be directly disposed not by the decoloring processing. If "v" is written in the check box, and "security disposition, inevitably" on display is touched, the disposition processing can be performed.

Figure 14:
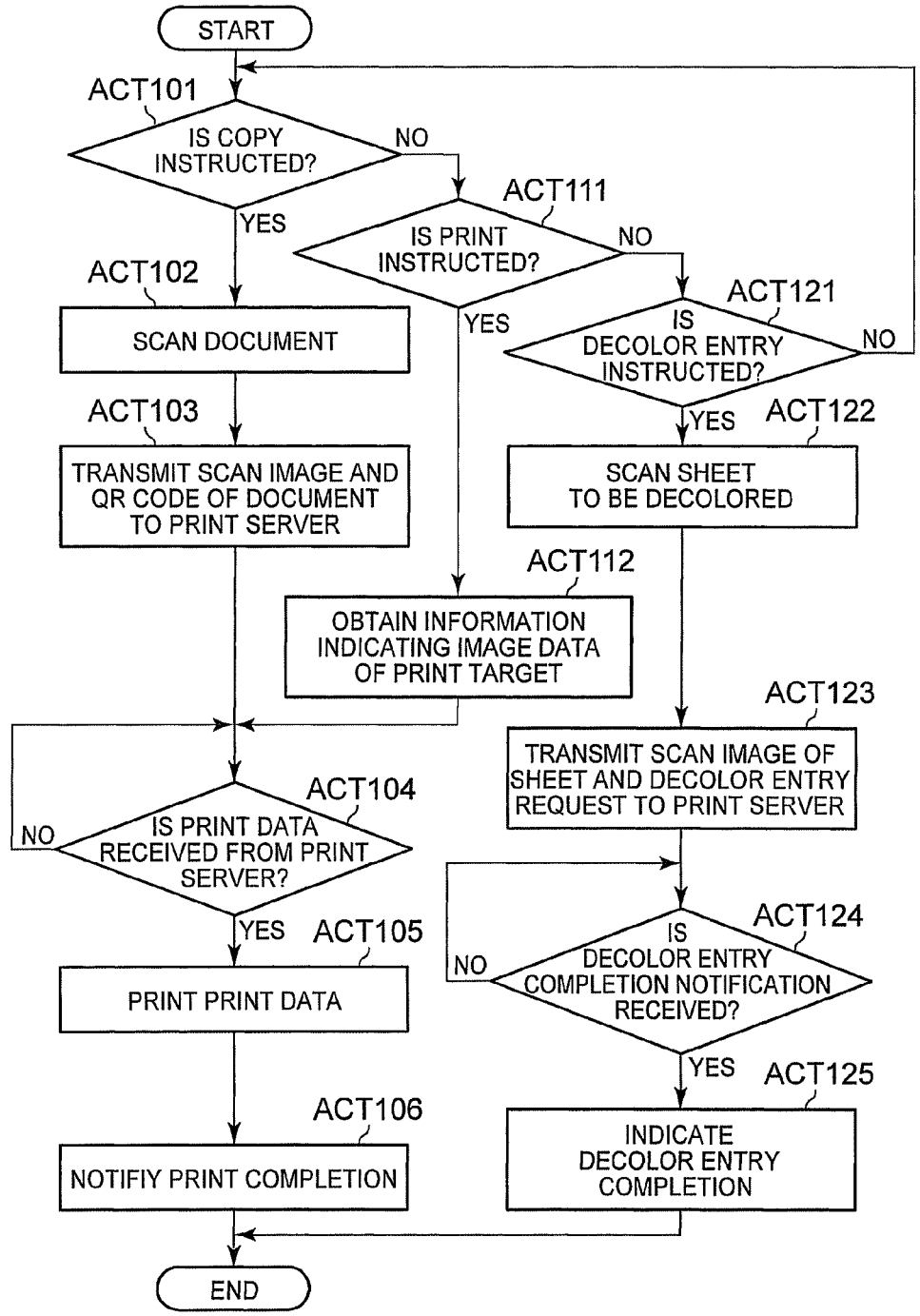
FIG. 14 is a flow chart showing an example of copy and print processing in the MFP and decolor entry processing in the decoloring device of the first embodiment.

Copy processing in the MFP 1 will be described with reference to FIG. 14.

A user who requests copying sets a document on the scanner 8 of the MFP 1, inputs copy setting by the operation panel 7, and instructs start of copying. Here, it is assumed that, under the condition that the copy image plane 71*a* is displayed as shown in FIG. 11, a user sets a document on which a QR code is printed on the scanner 8 and inputs instruction to perform coping by the operation panel 7.

The system controller 10 of the MFP 1 receives the instruction to perform copying from the operation panel 7. In case that the instruction to perform copying is received (ACT101, YES), the processor 11 reads the document set by the user by the scanner 8 (ACT102). The processor 11 of the system controller 10 transmits a scan image and QR code information of the document which have been read by the scanner 8 to the print server 2 (ACT103). After transmitting the scan image of the document to be copied, the processor 11 of the system controller 10 becomes in a wait state for receiving print data from the print server 2.

Receiving the print data from the print server 2 which has determined the print ID of the scan image from the QR code information and has judged that the print data can be copied (ACT104, YES), the processor 11 of the system controller 10 prints the received print data on a sheet by the printer 9 (ACT105). When printing the print data on the sheet by the printer 9 is completed, the processor 11 of the MFP 1 transmits a notification indicating completion of printing to the print server 2 that is a transmission source of the relevant print data, through the network interface 16 (ACT106).

Print processing in the MFP 1 will be described with reference to FIG. 14. A user to request print processing in the MFP 1 specifies a document (image) (image data) to be printed by the print image plane 71b of FIG. 12, and inputs an instruction to perform printing.

The system controller 10 of the MFP 1 receives the instruction to perform printing from the operation panel 7. In case that the instruction to perform printing is received (ACT111, YES), the processor 11 obtains information (a document ID and a page ID, for example) indicating image data of the print target specified by the user (ACT112).

After transmitting the information indicating the image data of the print target, the processor 11 of the system controller 10 becomes in a wait state for receiving print data from the print server 2 (ACT104). Receiving the print data from the print server 2 which has determined the document ID and the page ID and has judged that the print data can be printed (ACT104, YES), the processor 11 of the system controller 10 prints the received print data on a sheet by the printer 9 (ACT105). When printing the print data on the sheet by the printer 9 is completed, the processor 11 transmits a notification indicating completion of printing to the print server 2 that is a transmission source of the relevant print data through the network interface 16 (ACT106).

In addition, the print processing by the MFP 1 may be started depending on a print request from the user terminal 4. In case that the print processing is performed depending on the print request from the user terminal 4, the user terminal 4 performs processings of the above-described ACT111-ACT112, and the MFP 1 performs the processings of the above-described ACT104-ACT106.

Next, copy processing and print processing in the print server 2 will be described with reference to FIG. 15. In case that the print server 2 receives a copy request from the MFP 1 (ACT201, YES), the print server 2 obtains the scan image and the QR code information of a document from the MFP 1.

When the scan information of the document including the QR code information is received, the processor 21 of the print server 2 extracts the QR code information (QR code image) from the scan image (ACT202). Extracting the QR code information from the scan image, the processor 21 of the print server 2 recognizes (decodes) the extracted QR code information (ACT203). The processor 21 determines a print ID from the QR code information. The print ID is issued each time an image is printed on a sheet.

After decoding the QR code information extracted from the scan image, the processor 21 of the print server 2 issues a new print ID given to a sheet on which the image of the relevant document is to be copied (ACT204). The processor 21 registers, in connection with the newly issued print ID, the information such as the page ID of the image of the document, the print ID of one generation before, the number of generations in the print data area 27c of the administration table 27, (ACT205). The processor 21 searches the administration table 27 to thereby determine the page ID corresponding to the print ID of the document, the print ID of one generation before, and the number of generations, for example.

In addition, the processor 21 can convert (encode) the print ID into QR code information (ACT206). In case that the MFP 1 uses a reuse sheet, since the QR code has been printed on the reuse sheet already, the processor 21 does not supply the QR code information (QR code image) made by imaging the print ID to the MFP 1. In case that the MFP 1 uses a unused sheet, the processor 21 converts the print ID for the image of each page into imaged QR code information (QR code image) and supplies it to the MFP 1.

In case that the MFP 1 prints an image on a reuse sheet, the processor 21 forms print data in which QR code information is not arranged (an image for printing and QR code image are combined) on the non-image region, and in case that the MFP 1 prints on a unused sheet, the processor 21 forms print data in which QR code information is arranged (an image for printing and QR code image are combined) on the non-image region (ACT207). In addition, in the case of the copy processing, the processor 21 may determine image data of the master of the relevant document specified from the print data area 27c and the page memory area 27b of the administration table 27 as an image for printing.

After forming the print data, the processor 21 transmits the formed print data to the MFP 1 (ACT208). After the print data is transmitted, the print server 2 waits for a print completion notification from the MFP 1 (ACT209). In case that the notification of the print completion is received from the MFP 1 (ACT209, YES), the processor 21 of the print server 2 registers the relevant print processing in the operation log memory area 27d (ACT210). For example, the processor 21 registers, in relation to the print ID, the time and date when printing (copying) is performed, the user ID of the user who has instructed printing, the information indicating that the processing content is copying or printing, and the size of the printed sheet in the operation log memory area 27d as the history information of the print processing (or copy processing) for one case.

In addition, the processor 21 updates the print data area 27c and the used amount memory area 27f (ACT211, ACT212-ACT215). After the print completion notification is received, for example, the processor 21 updates the decoloring flag corresponding to the print ID of the printing completed sheet to the information "false" indicating non-decolored or during use in the print data area 27c (ACT211).

After the print completion notification is received, the processor 21 determines the user ID corresponding to the print ID of the printing completed sheet (the user ID of the user which is to be updated in the used amount memory area 27f). Having determined the user ID of the printing completed sheet, the processor 21 counts the number of sheets which the user of the relevant user ID has not decolored (during use) from the information registered in the operation log memory area 27d (ACT212). The number of sheets which the user is using may be counted by adding the number of newly printed sheets to the used amount of the sheets which has been registered in the used amount memory area 27f.

When the used amount of sheets of the user to be updated is counted, the processor 21 obtains the acceptable amount of sheets for the relevant user from the acceptable amount memory area 27e (ACT213). The processor 21 calculates a usage rate of sheets for the relevant user from the obtained used amount and the acceptable amount of sheets (ACT 214). For example, the processor 21 calculates the usage rate of sheets by (used amount)/(acceptable amount)×100[%]. Having calculated the usage rate, the processor 21 updates the used amount of sheets and the usage rate of sheets corresponding to the relevant user ID (ACT 215).

In addition, in case that the printer server 2 receives a print request from the MFP 1 or the user terminal 4 (ACT221, YES), the processor 21 of the print server 2 moves to ACT204, and issues a new print ID given to a sheet on which the received image for printing is to be printed (ACT204). After issuing the print ID for the image data for printing, the processor 21 executes the processing of the above-described ACT205-ACT215.

The document administration system 100 stores the information indicating the state of the sheet on which the document is copied by copy processing or the sheet on which the image is printed by print processing in the administration table 27, and stores the information related to the used amount of sheets for each user in the used amount memory area 27*f*. According to the document administration system 100, the copied or printed sheet can be administered, and the used amount of the sheets for each user can easily be administered.

In addition, the MFP 1 may execute a part or all of the above-described processings (ACT201-ACT215) which the print server 2 executes. Each of the processings ACT201-ACT215 is a function which the processor can put into practice by executing the program. For this reason, the processor 11 of the MFP 1 can execute each of the processings ACT201 to ACT215. According to the embodiment in which the processor 11 of the MFP 1 executes each of the processings ACT201 to ACT215, even the stand-alone MFP 1 can put the above-described copy processing and print processing into practice.

Next, the decolor entry processing in the document administration system 100 will be described. The decolor entry processing is processing to register performing the decoloring or the security disposition of a sheet that is the print result depending on the security level, for example. In the decolor entry processing, the MFP 1 scans the sheet to be decolored by the scanner 8. The MFP 1 transmits the scanned image of the sheet to be decolored to the print server 2. The print server 2 identifies the sheet to be decolored (print ID, for example) by the QR code information included in the scanned image. Having identified the print ID of the sheet to be decolored, the print server 2 updates the state of the sheet to be decolored into information indicating that the sheet is in the decolored state. That is, the print server 2 makes the decoloring flag indicating the state of the sheet corresponding to the relevant print ID "true" (information indicating decolored state).

However, the processing to scan a sheet to be decolored may be performed by a device which is separate from the MFP 1 and capable of data communication with the print server 2 through the network 5. For example, the scanner 62 of the decoloring device 6 to decolor the image of the sheet on which the image has been formed with erasable coloring agent may execute the processing to scan the sheet to be decolored, for example. This decoloring device 6 is provided with a function to transmit the QR code of the sheet to be decolored to the print server 2. Having identified the print ID of the sheet to be decolored by the QR code information read out by the scanner 62, the print server 2 makes the flag of the scanner 62 of the decoloring device 6 indicating the state of the sheet corresponding to the relevant print ID "true" (information indicating decolored state).

In the following description, it is assumed that the scanner 8 of the MFP 1 scans a sheet to be decolored in the decolor entry processing. The decolor entry processing in the MFP 1 will be described with reference to FIG. 14. A user to request the decolor entry sets a sheet to be decolored on the scanner 8 of the MFP 1, and instructs start of the decolor entry by the operation panel 7. When the user pushes the decolor entry button 70*d* in the standby image plane shown in FIG. 10, the display unit 7*a* of the operation panel 7 displays the decolor entry image plane 71*c* as shown in FIG. 13.

In the system controller 10 of the MFP 1, in case that an instruction of start of the decolor entry is received from the operation panel 7 (ACT121, YES), the processor 11 reads out an image (an image including information indicating a sheet to be decolored) of a sheet to be decolored set by the user by the scanner 8 (ACT122). The processor 11 of the system controller 10 transmits the scan image of the sheet to be decolored which is read out by the scanner 8 and the decolor entry request to the print server 2 (ACT123).

The MFP 1 may transmit the QR code information indicating the sheet to be decolored to the print server 2, in place of the scan image of the sheet to be decolored. In addition, in case that the scanner 62 of the decoloring device 6 scans the sheet to be decolored, the scanner 62 reads out the QR code of the sheet to be decolored, and transmits the QR code information indicating the sheet to be decolored to the print server 2. The MFP 1 may decode the QR code image included in the scanned image of the sheet to be decolored, and may transmit the print ID of the sheet to be decolored which is determined from the decoded QR code information along with the decolor entry request to the print server 2.

In addition, information indicating a sheet to be decolored such as a print ID may be inputted from the operation panel 7. In this case, the MFP 1 has only to transmit the information indicating the sheet to be decolored such as the print ID inputted from the operation panel 7 along with the decolor entry request to the print server 2.

After the MFP 1 transmits the decolor entry request, the processor 11 of the system controller 10 waits for a notification of decolor entry completion from the print server 2 (ACT124). Having received the notification of the decolor entry completion from the print server 2 (ACT124, YES), the processor of the MFP 1 displays a guide indicating that the decolor entry is completed on the display unit 7*a* (ACT125).

Next, the decolor entry processing in the print server 2 will be described with reference to FIG. 15. In the case of receiving the decolor entry request (ACT231, YES), the print server 2 obtains the scan image of the sheet to be decolored including the QR code information along with the decolor entry request. When the scan image of the sheet to be decolored including the QR code information is obtained, the processor 21 of the print server 2 extracts the QR code information (QR code image) from the scan image (ACT232). Having extracted the QR code information from the scan image, the processor 21 recognizes (decodes) the extracted QR code information (ACT233). The processor 21 determines the print ID from the QR code information.

After decoding the QR code information extracted from the scan image, the processor 21 of the print server 2 registers information indicating that the sheet of the print ID determined from the QR code information has been decolored in the operation log memory area 27*d* (ACT234). For example, the processor 21 registers, in connection with the print ID, the time and date when the decoloring is performed, the user ID of the user who has instructed the decolor entry, the information indicating that the processing content is decoloring (reuse, recycle, security disposition) and the size of the decolored sheet in the operation log memory area 27*d* as the history information of the decolor entry processing for one case. Having registered the history information indicating the decolor entry processing in the operation log memory area 27*d*, the processor 21 notifies that the decolor entry is completed to the MFP 1 (ACT235). The reuse means that the image on the sheet is decolored to thereby use the sheet again. The recycle means that the used sheets are used as raw materials and are combined to form recycled sheets. The security disposition means that the sheet on which the information with high security is printed is disposed.

After obtaining the print ID of the sheet to be decolored, the processor 21 of the print server 2 updates the print data area 27*c* and the used amount memory area 27*f* (ACT211, ACT212 to ACT215). As the updating processing of the print data area 27*c*, the processor 21 updates the decoloring flag corresponding to the print ID of the sheet to be decolored to "true" (information indicating the decolored state) in the print data area 27*c*, for example (ACT211).

In addition, as the update processing of the used amount memory area 27*f*, the processor 21 determines the user ID (the user ID of the user which is to be updated in the used amount memory area 27D corresponding to the print ID of the decolored sheet, for example. Determining the user ID of the user who has decolored, the processor 21 counts the number of sheets which the user of the relevant user ID has not decolored (during use) from the information registered in the operation log memory area 27*d* (ACT212). The processor 21 may subtract the number of the decolored sheets from the used amount of the sheets which has been registered in the used amount memory area 27*f* to thereby count the number of sheets which the user is using.

When the used amount of sheets of the user to be updated is counted, the processor 21 obtains the acceptable amount of sheets for the relevant user from the acceptable amount memory area 27*e* (ACT213). The processor 21 calculates a usage rate of sheets for the relevant user from the obtained used amount and the acceptable amount of sheets (ACT 214). The processor 21 calculates the usage rate of sheets by (used amount)/(acceptable amount)×100[%]. Having calculated the usage rate, the processor 21 updates the used amount of sheets and the usage rate of sheets corresponding to the relevant user ID in the used amount memory area 27*f* (ACT 215).

After updating the print data area 27*c* and the used amount memory area 27*f*, the processor 21 may identify the decolor entry completion to the MFP 1.

In the above-described decolor entry processing, the document administration system 100 scans an image of a sheet to be decolored by the scanner 8, and discriminates the print ID of the sheet from the QR code information included in the scanned image. The document administration system 100 discriminates the user ID from the print ID, registers the information related to the decolored sheet in connection with the print ID in the operation log memory area 27*d*, updates the state of the sheet identified by the print ID to the decolored state in the print data area 27*c*, and also updates the information indicating the used amount in the used amount memory area 27*f*. According to the above-described decolor entry processing, the decoloring of the copied or printed sheet can be administered, and the used amount of the sheets for each user can easily be administered.

In addition, the MFP 1 may executes a part or all of the above-described processings (ACT231 to ACT235, ACT211 to ACT215) which the print server 2 executes. Each of the processings ACT231 to ACT235, ACT211 to ACT215 is a function which the processor can put into practice by executing the program. For this reason, the processor 11 of the MFP 1 can execute each of the processings ACT231 to ACT235, ACT211 to ACT215. If the processor 11 of the MFP 1 executes each of the processings ACT231 to ACT235, ACT211 to ACT215, even the stand-alone MFP 1 can put the above-described decolor entry processing into practice.

Figure 16:
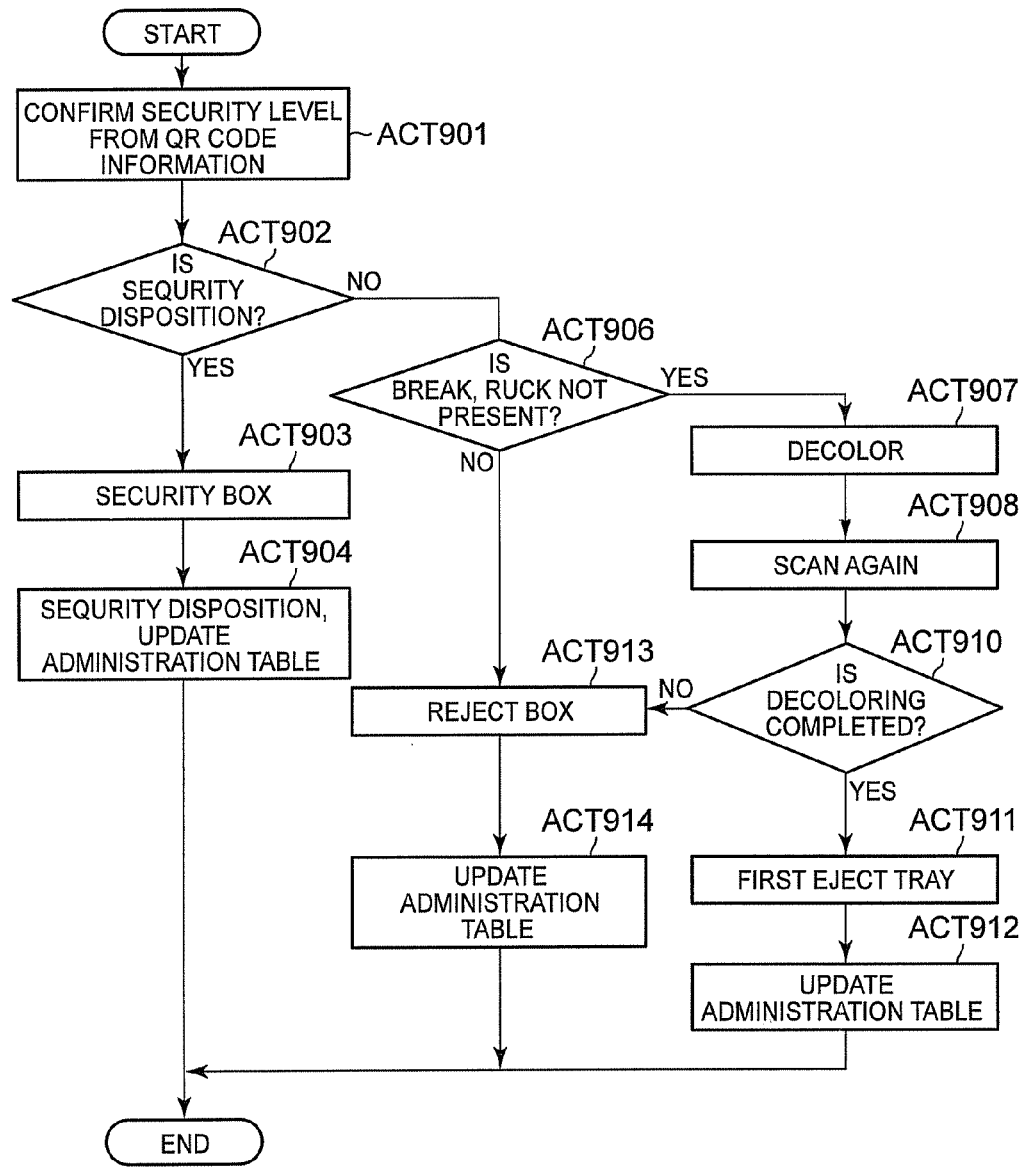
FIG. 16 is a flow chart showing decoloring processing in the decoloring device of the first embodiment.

A user decolors a sheet whose decolor entry has been completed in ACT125 by the decoloring device 6. The decoloring device 6 decolors a sheet which the user desires to be decolored including the sheet whose decolor entry has been completed. The decoloring operation by the decoloring device 6 will be described with reference to FIG. 16. The user sets a sheet which the user desires to be decolored in the sheet supply tray 61*a*, and inputs start of decoloring operation from the operation panel 6*a*. The processor 21 confirms the security level of the sheet from the QR code information extracted from the QR code read out by the scanner 62 (ACT901). In case that the sheet requires security disposition to surely dispose the sheet from its security level in ACT902, for example, the decoloring device 6 conveys the sheet to the security box 68 with a key or a password (ACT903). The sheet recovered in the security box 68 is security disposed. The print server 2 adds the security disposition processing of the sheet to the administration information connected to the print ID determined from the QR code information as new administration information, to thereby update the administration table 27. The processor 21 of the print server 2 registers the relevant security disposition processing in the operation log memory area 27*d* (ACT904) and finishes the decoloring processing of the sheet.

In case that a sheet is reused from the security level (ACT902, NO), if break or ruck is not present in the sheet from the print status scanned by the scanner 62 (ACT906, YES), the decoloring unit 63 decolors the image of the sheet (ACT907). The scanner 62 scans again the sheet in order to confirm whether the image of the sheet has been surely decolored (ACT908). In case that the image of the sheet has been surely decolored (ACT910, YES), the decoloring device 6 conveys the sheet to the first eject tray 66 for reuse (ACT911). The print server 2 adds the reuse of the sheet as new administration information to the administration information connected to the print ID determined from the QR code information, to thereby update the administration table 27. The processor 21 of the print server 2 registers the relevant reuse processing in the operation log memory area 27*d* (ACT912), and finishes the decoloring operation of the sheet. In case that the image of the sheet has not been surely decolored (ACT910, NO), the decoloring device 6 conveys the sheet to the reject box 67 (ACT913). The print server 2 adds the recycle of the sheet as new administration information to the administration information connected to the print ID determined from the QR code information, to thereby update the administration table 27. The processor 21 of the print server 2 registers the relevant recycle processing in the operation log memory area 27*d* (ACT914), and finishes the decoloring operation of the sheet.

In case that a sheet is reused from the security level, if break or ruck is present in the sheet from the print status scanned by the scanner 62 (ACT906, NO), the decoloring device 6 conveys the sheet to the reject box for recycle (ACT913). The print server 2 adds the recycle of the sheet as new administration information to the administration information connected to the print ID determined from the QR code information, to thereby update the administration table 27. The processor 21 of the print server 2 registers the relevant recycle processing in the operation log memory area 27*d* (ACT914), and finishes the decoloring operation of the sheet.

Figure 17:
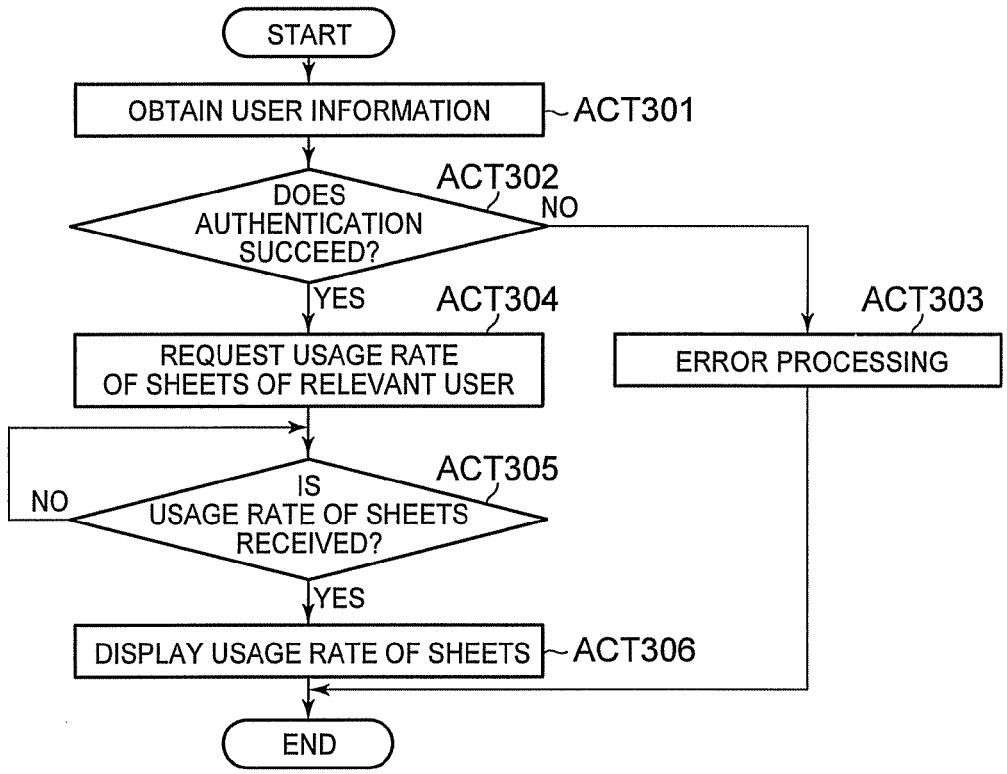
FIG. 17 is a flow chart showing an operation of the MFP in the processing to guide a usage rate of sheets of the first embodiment.

Next, processing to display a usage rate of sheets to a user will be described with reference to FIG. 17. The document administration system 100 is provided with a function to display a usage rate to a logged-in user. The MFP 1 is provided with a function to display a usage rate of sheets of a logged-in user on the display unit 7a of the operation panel 7, for example.

The MFP 1 obtains user information from a user who desires to login (ACT301). The user to login inputs user information such as a user ID and a password from the operation panel 7 of the MFP 1, for example. In addition, the MFP 1 may read out an IC card which a user to login possesses to thereby obtain the user information. When the user information is obtained, the processor 11 of the system controller 10 of the MFP 1 transmits a user authentication request along with the obtained user information to the user administration server 3. The user administration server 3 performs user authentication from the user information obtained from the MFP 1, and transmits the user authentication result to the MFP 1.

In case that a notification indicating that the authentication of the relevant user has failed is received from the user administration server 3 (ACT302, NO), the processor 11 performs error processing such as retrying (ACT303). In case that a notification indicating that the authentication of the relevant user has succeeded is received from the user administration server 3 (ACT302, YES), the processor 11 of the MFP 1 requests information indicating the usage rate of the sheets of the relevant user (the user indicated by the user ID) to the print server 2 (ACT304). In case that the authentication has succeeded, the MFP 1 obtains the user ID in order to identify at least the relevant user from the user administration server 3. That is, the processor 11 requests the usage rate of sheets corresponding to the user ID of the user who has succeeded in the authentication to the print server 2.

After requesting the information indicating the usage rate of sheets, the processor 11 enters a wait state for receiving the information indicating the usage rate of sheets from the print server 2. In case that the information indicating the usage rate of sheets of the user from the print server 2 is received (ACT305, YES), the processor 11 displays the present usage rate of sheets of the user on the display unit 7a of the operation panel 7 (ACT306). The processor 11 may display the used amount of sheets of the user along with the usage rate of sheets by the user, for example, or may display the usage rate of sheets of the division, the floor or the whole office. In addition, the processor 11 may display the usage rate of sheets on the standby image plane shown in FIG. 10.

Figure 18:
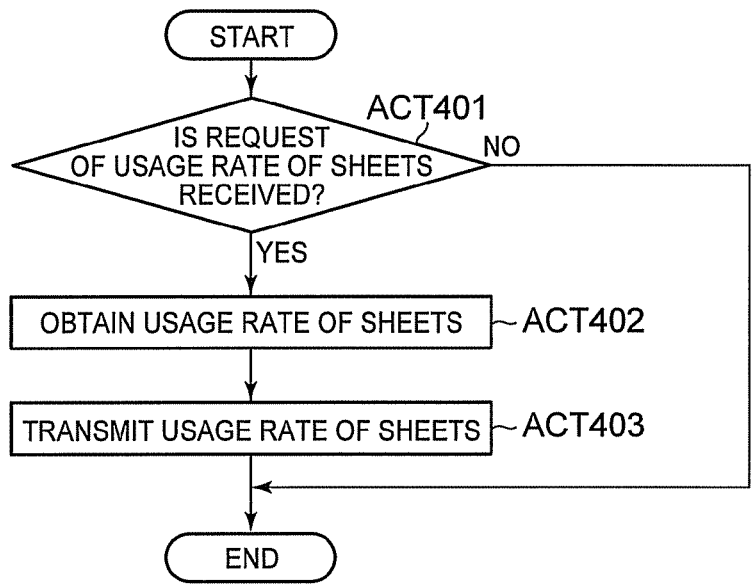
FIG. 18 is a flow chart showing an operation of the print server in the processing to guide a usage rate of sheets of the first embodiment.

The operation of the print server 2 in the processing to display the usage rate of sheets will be described with reference to FIG. 18. It is assumed that the print server 2 has received a notification request of the usage rate of sheets corresponding to the designated user ID from the MFP 1. In case that the notification request of the usage rate of sheets is received (ACT401, YES), the processor 21 of the print server 2 searches the used amount memory area 27f with the designated user ID, to thereby obtain the usage rate of sheets corresponding to the relevant user ID from the used amount memory area 27f (ACT402). When the usage rate of sheets corresponding to the relevant user ID is obtained, the processor 21 transmits the information indicating the obtained usage rate of sheets to the MFP 1 (ACT403).

Figure 15:
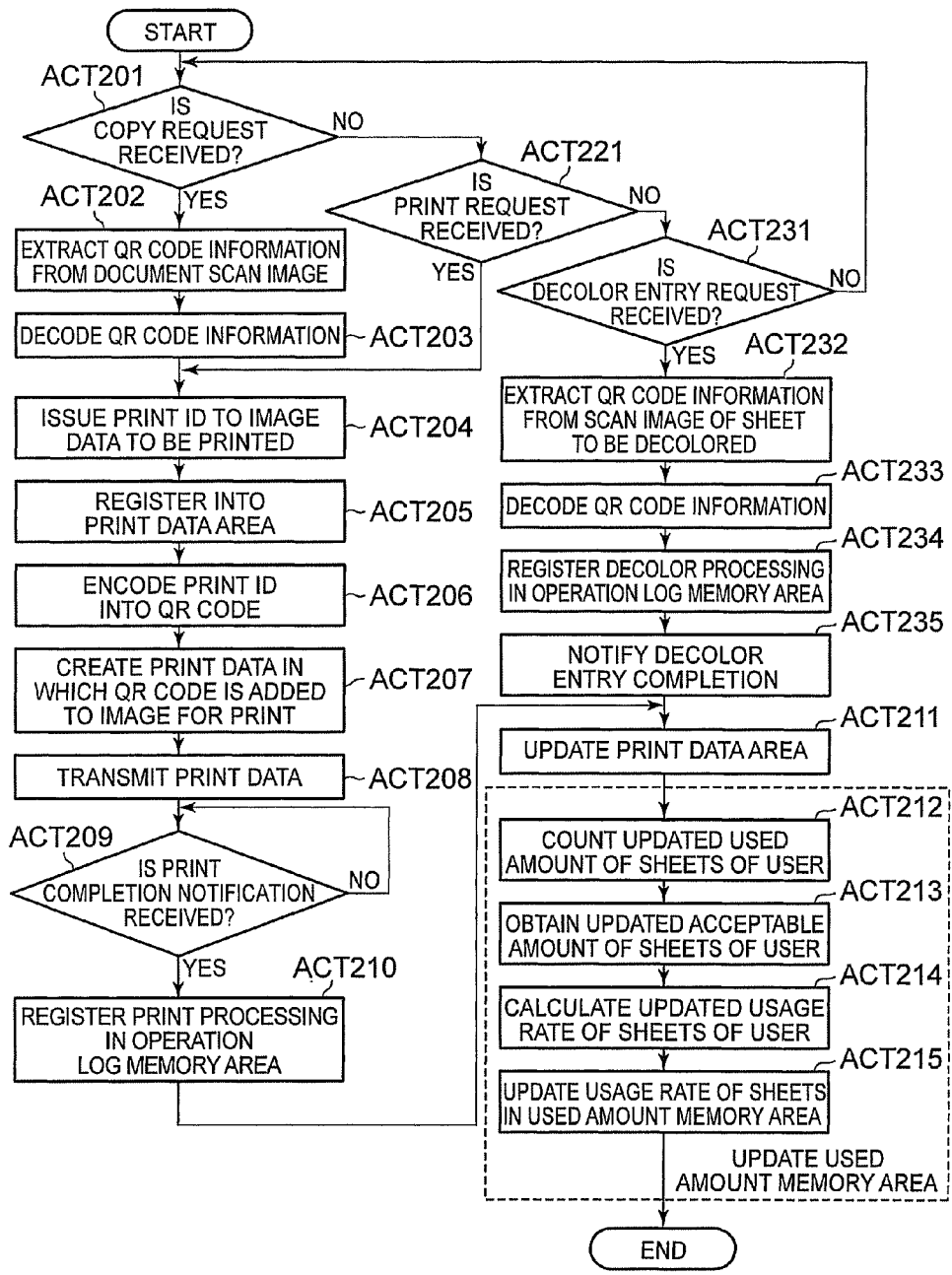
FIG. 15 is a flow chart showing an example of copy and print processing in the print server and decolor entry processing in the decoloring device of the first embodiment.

In addition, the processor 21 may execute the processings of ACT212-ACT215 shown in FIG. 15 as the processing of ACT402. That is, in case that the usage rate of sheets is requested, the processor 21 may calculate the usage rate from the used amount and the acceptable amount of sheets of the relevant user and may notify the usage rate to the MFP 1. In case that the processings of ACT212-ACT215 shown in FIG. 15 are executed as the processing of ACT402, the processings of ACT212-ACT215 can be omitted in the print processing and the decolor entry processing shown in FIG. 15.

In addition, the print server 2 may also obtain information (used amount (the number of used sheets), the acceptable amount and so on, for example) except the usage rate of sheets corresponding to the relevant user ID from the each of the areas 27c-27f and may notify such information to the MFP 1. In this case, the MFP 1 can also display the information except the usage rate of sheets on the display unit 7a of the operation panel 7.

In the above-described display processing of the usage rate, in case that a user has logged in, the MFP 1 obtains the usage rate of sheets of the logged-in user from the print server 2. The MFP 1 displays the present usage rate of sheets of the relevant user from the print server 2 on the display unit 7a of the operation panel 7. Since the usage rate of sheets of oneself is displayed on the display unit 7a, each time the user logs in the user can recognize the present using status of the sheets.

In addition, the MFP 1 may execute a part or all of the above-described processings (ACT401 to ACT403) which the print server 2 executes. Each of the processings ACT401 to ACT403 is a function which the processor can put into practice by executing the program. For this reason, the processor 11 of the MFP 1 can execute each of the processings ACT401 to ACT403. If the processor 11 of the MFP 1 executes each of the processings ACT401 to ACT403, even the stand-alone MFP 1 can put the above-described processing to guide the usage rate of sheets to the user into practice.

Figure 19:
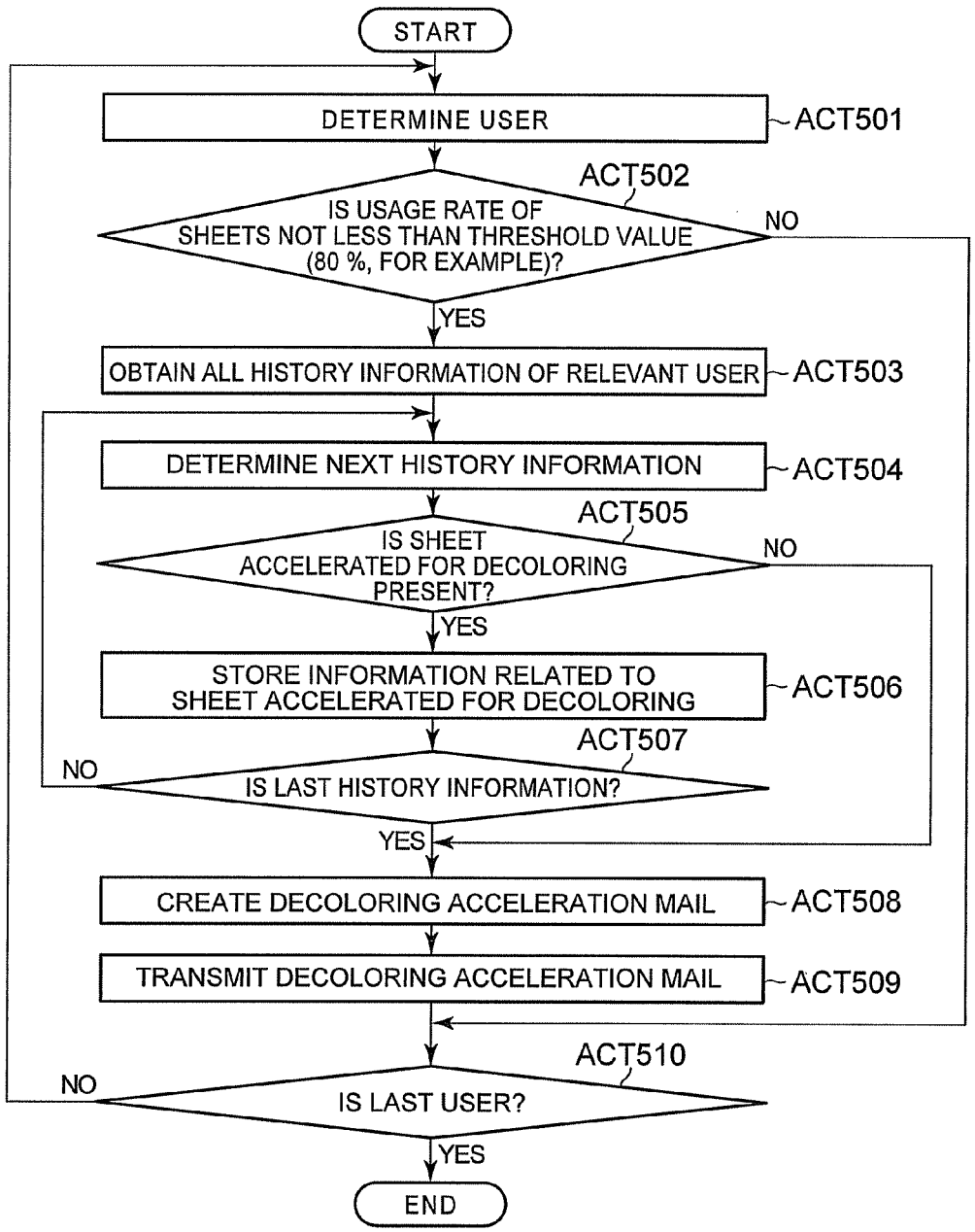
FIG. 19 is a flow chart showing an example of processing to transmitting a mail to remind the decoloring of a sheet of the first embodiment.

Next, processing (decoloring acceleration processing) to accelerate a user whose usage rate of sheets is high to decolor a sheet will be described with reference to FIG. 19. The print server 2 is provided with a function to transmit a mail to accelerate a user whose usage rate of sheets is high to decolor a sheet. The print server 2 judges whether or not the usage rate of sheets exceeds a certain threshold value (80%, for example) for each user. The print server 2 transmits a mail to a user whose usage rate of sheets exceeds the threshold value to accelerate the decoloring of a sheet whose expiration date is close. In addition, the decoloring acceleration processing may be executed to all users having history information to have used sheets in the document administration system 100, or may be executed to all users (users whose usage rate is 1% or more) who are using sheets.

The print server 2 performs processing (decoloring acceleration processing) to transmit a mail for reminding a user whose usage rate is high to decolor a sheet periodically (every day, every 10 days, once every week or every month, or the like, for example). In addition, the print server 2 may perform the decoloring acceleration processing depending on an instruction of administrator of the document administration system 100. In the decoloring acceleration processing, the processor 21 refers to the used amount memory area 27f, to thereby check the usage rate of sheets for each user.

The processor 21 determines a user whose usage rate of sheets is to be checked (ACT501). The processor 21 refers to the used amount memory are 27f, and judges whether or not the usage rate of sheets of the relevant user is not less than the threshold value (80%, for example) for reminding the decoloring (ACT502).

In case that the usage rate of sheets of the relevant user is not less than the threshold value to remain the decoloring (ACT 502, YES), the processor 21 refers to the operation log memory area 27*d*, to thereby check the sheet which the relevant user is using (not decolored). The processor 21 obtains a list of the history information of the relevant user from the operation log memory area 27*d* (ACT 503). The processor 21 determines history information to be checked from the obtained list. The processor 21 checks whether or not the decoloring of the sheet as the print result (including the print result by copying) is to be accelerated for each history information (ACT505).

The processor 21 may determine a sheet which is accelerated for decoloring (sheet of candidate to be decolored) based on the expiration date of the printed image which is set by a decoloring acceleration level and the present time and date. In this case, the processor 21 checks the state of the decoloring flag corresponding to the print ID included in the relevant history information by the print data area 27*c*. If the decoloring flag is in a state indicating the non-decolored state, the processor 21 obtains the expiration date for the image of the page ID corresponding to the relevant print ID from the page memory area 27*b*. The processor 21 judges whether or not a period from the present time and date till the obtained expiration date is within a period for the decoloring acceleration (a week ago, 10 days ago, a month ago, 2 months ago, and so on, for example). In case that the period till the expiration date is within the period for the decoloring acceleration, the processor 21 judges that the decoloring of the sheet as the print result which the relevant history information indicates is to be accelerated.

In addition, the processor 21 may determine a sheet which is to be accelerated for decoloring depending on the security level of the printed image which is set by the decoloring acceleration level. In this case, the processor 21 checks the state of the decoloring flag corresponding to the print ID included in the relevant history information by the print data area 27*c*. If the decoloring flag is in a state indicating the non decolored state, the processor 21 obtains the security level for the image of the page ID corresponding to the relevant print ID from the page memory area 27*b*. The processor 21 judges whether or not the obtained security level is a level for the decoloring acceleration (not more than a security level "2", for example). In case that the security level is the level for decoloring acceleration, the processor 21 judges that the decoloring of the sheet as the print result which the relevant history information indicates is to be accelerated.

In case that the sheet is judged as a sheet which is to be accelerated for decoloring from the history information, the processor 21 stores the information (the printed time and date, the operation content, the file name, the page number and so on, for example) related to the sheet judged to be accelerated for decoloring in the memory such as the RAM 22 (ACT506). The information related to the sheet judged to be accelerated for decoloring is the information of the sheet which is accelerated for decoloring which is stated in a mail transmitted to a user. In other words, the processor 21 determines the information of the sheet which is accelerated for decoloring depending on the specification of the mail transmitted to the user to accelerate the decoloring of the sheet.

In case that the information of the sheet which is accelerated for decoloring is stored in the RAM 22 (ACT506), or in case that the print result of the relevant history information is not a sheet which is accelerated for decoloring (ACT505, NO), the processor 21 judges whether or not the checked history information is the last history information (whether or not all history information for the relevant user have been checked) (ACT507). When that next history information to be checked is present is judged (ACT507, NO), the processor 21 returns to the above-described ACT504 and checks the next history information.

When that checking all the history information for one user has been completed is judged (ACT507, YES), the processor 21 creates a decoloring acceleration mail to be transmitted to the user terminal 4 and so on, for example, of the relevant user (ACT508). The decoloring acceleration mail is a mail for stimulating a user to decolor a sheet. The processor 21 states the information of the sheet judged to be accelerated for decoloring based on the expiration date or the security level.

Figure 20:
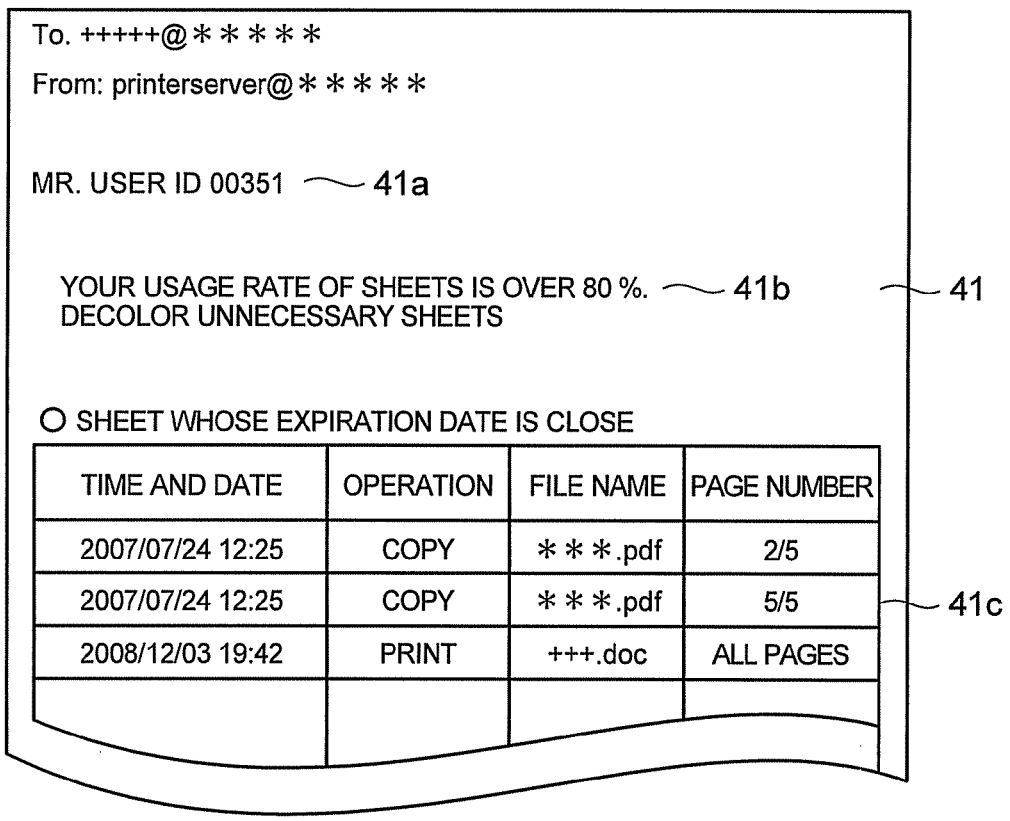
FIG. 20 is an explanatory diagram showing an example of the mail to remind the decoloring of a sheet of the first embodiment.

FIG. 20 shows an example of a decoloring acceleration mail 41 which is to be transmitted to the user terminal 4, and in the decoloring acceleration mail 41, a user name 41*a*, a guide message 41*b* to accelerate the decoloring of a sheet, and a list 41*c* of the sheets to become the candidates to be decolored as sheets accelerated for decoloring are stated, for example. The processor 21, as the list 41*c* of sheets to become the candidates to be decolored, creates a list of the sheets on which the images whose expiration dates are close are printed, for example. In the case of creating the list of the sheets whose expiration dates are close, the processor 21 accumulates the history information indicating the sheets whose expiration dates are close (sheets on which images whose expiration date end within one month are respectively printed), for example) in the memory such as the RAM 22, as the information indicating the sheets of the candidates to be decolored, by the above-described processing of ACT 506. The processor 21 creates the list 41*c* of sheets to become the candidates to be decolored in which the sheets on which images whose expiration date are close are printed are arranged in ascending order of the expiration date.

Or, the processor 21, as a list of sheets to become the candidates to be decolored, creates a list of sheets on which images with low security level are printed. In the case of creating a list of the sheets on which the images with low security level are printed as the list of sheets to become the candidates to be decolored, the processor 21 accumulates the history information indicating the sheets with low security level (sheets on which the images with the security level of not more than "2" are printed, for example) as the information indicating the sheets of the candidates to be decolored in the memory such as the RAM 22, in the above-described processing of the ACT506. The processor 21 creates a list of the sheets to become the candidates to be decolored in which the sheets on which the images with low security level are printed are arranged in ascending order of the security level.

In addition, the processor 21 may attach a thumbnail image of the image printed on the sheet which is accelerated for decoloring to the decoloring acceleration mail. For example, the processor 21 refers to each of the areas 27*a*-27*d* to thereby obtain the master data of the page printed on a sheet which is accelerated for decoloring, and can create a thumbnail image from the obtained master data.

Having created the decoloring acceleration mail, the processor 21 transmits the created decoloring acceleration mail to the relevant use (the user terminal 4, for example). The processor 21 obtains the mail address of the user of the transmission destination to which the decoloring acceleration mail is to be transmitted from the user administration server 3. The mail address of the user may be stored in the HDD 24 and so on of the print server 2.

In the case of transmitting the decoloring acceleration mail (ACT509), or when that the usage rate of sheets of the relevant user is less than the threshold value for decoloring reminder is judged (ACT502, NO), the processor 21 judges whether or not the usage rates of sheets for all users have been checked (whether or not the usage rate of sheets for the last user has been checked) (ACT510). When that a next user is present whose usage rate of sheets is to be checked is judged (ACT510, NO), the processor 21 returns to the above-described ACT501, and checks the usage rate of sheets of the next user. When that the usage rate of sheets for all users have been checked is judged (ACT510, YES), the processor 21 finishes the relevant decoloring acceleration processing.

In addition, the processor 21 may output the information related to the sheet of the candidate to be decolored which is elected by the above-described decoloring acceleration processing to the MFP 1 as the information to be displayed on the display unit 7a of the operation panel 7. The processor 21 may output the information indicating the list of sheets to become the candidates to be decolored which is described in the above-described decoloring acceleration mail to the MFP 1, for example. In case that the information indicating the list of sheets to become the candidates to be decolored is obtained, the MFP 1 displays, as the list of the candidates to be decolored, a list of candidates to be decolored which are arranged in ascending order of the expiration date or a list of candidates to be decolored which are arranged in ascending order of the security level.

In the above-described decoloring acceleration processing, the processor 21 transmits a decoloring acceleration mail to accelerate a user whose usage rate is high to decolor a sheet. In addition, in the decoloring acceleration processing, the processor 21 extracts the information indicating a sheet which is to be accelerated for decoloring, such as a sheet on which an image with the close expiration date is printed or a sheet on which an image with low security level is printed, from each of the areas 27a-27d, and writes the information indicating the sheet which is to be accelerated for decoloring in the decoloring acceleration mail. According to the decoloring acceleration processing, it is possible to accelerate a user whose usage rate of sheets is high to decolor a sheet. According to the decoloring acceleration processing, it is possible to present the information indicating the sheet to become the candidate to be decolored.

In addition, the MFP 1 may execute a part or all of the above-described processings (ACT501-ACT510) which the print server 2 executes. Each of the processings ACT501-ACT510 is a function which the processor can put into practice by executing the program. For this reason, the processor 11 of the MFP 1 can execute each of the processings ACT501-ACT510. If the processor 11 of the MFP 1 executes each of the processings ACT501-ACT510, the stand-alone MFP 1 can put the above-described decoloring acceleration processing into practice.

Figure 21:
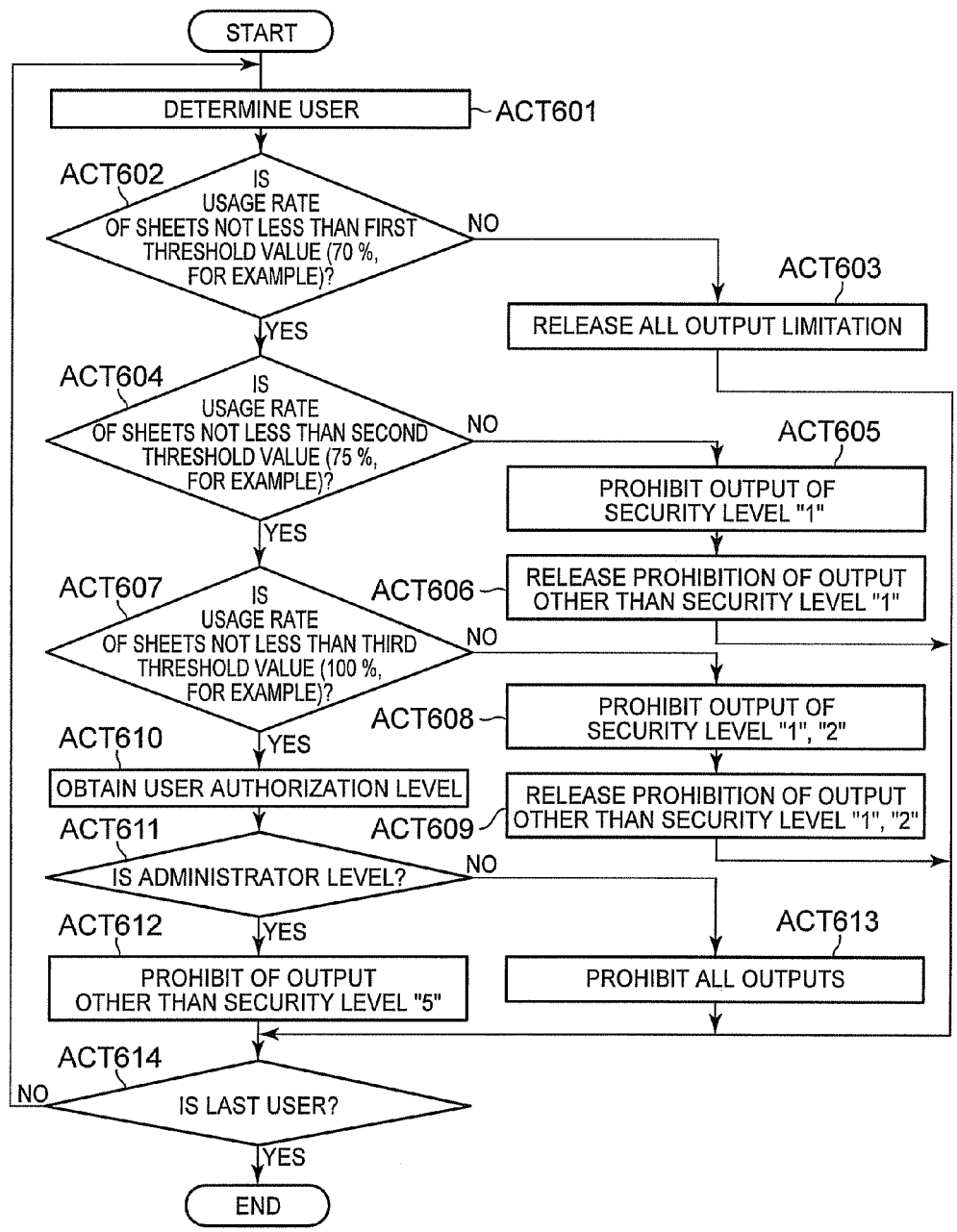
FIG. 21 is a flow chart showing an example of print limitation processing of the first embodiment.

Next, print limitation processing which limits printing depending on the usage rate of sheets for each user will be described with reference to FIG. 21. The print limitation processing depending on the usage rate of sheets is a processing in which the print server 2 limits printing an image depending on the usage rate of sheets in a stepwise fashion. The print server 2 prohibits printing an image of the security level according to the usage rate of sheets. The print server 2 stores a plurality of threshold values in order to limit output (print) in a stepwise fashion. Each of the threshold values is a threshold value for the usage rate of sheets. The print limitation by the print limitation processing can be executed for each user, for each division, for each floor, or for whole office. The print limitation processing can limit printing depending on the usage rate of sheets of each user, the usage rate of sheets of each division, the usage rage of sheets of each floor, or the usage rate of sheets of whole office.

The print server 2 performs the print limitation processing depending on the usage rate of sheets periodically (every day, every 10 days, once every week or every month, or the like, for example). In addition, the print server 2 may perform the print limitation processing each time to execute printing or depending on an instruction of an administrator of the document administration system 100. In the example of the print limitation processing shown in FIG. 21, the processor 21 shall perform processing to limit printing (print limitation processing) an image of the security level ("1"-"5", for example) according to the usage rate of sheets for each user.

The processor 82 determines a user whose usage rate of sheets is to be checked (ACT601). The processor 82 determines the users registered in the used amount memory area 27f as check targets in sequence, respectively. When the user of the check object is determined, the processor 82 judges, with reference to the used amount memory area 27f, whether or not the usage rate of sheets of the relevant user is not less than a first threshold value for print limitation (70%, for example) (ACT602). In case that the usage rate of sheets of the relevant user is less than the first threshold value for print limitation (ACT602, NO), the processor 21 releases the output (print) limitations of all sheets for the relevant user (ACT603), and then the processing moves to ACT614.

For example, the processor 21 obtains the print ID of the sheet which the relevant user has outputted (copied or printed) from the operation log memory area 27d, and makes the output flags for the all pages corresponding to the obtained print ID "false (output permission state) in the page memory area 27b. In addition, the processor 21 may store, as the print limitation processing for each user, the information indicating that the print limitation is not present corresponding to the relevant user ID in the used amount memory area 27f.

In case that the usage rate of sheets of the relevant user is not less than the first threshold value for print limitation (ACT602, YES), the processor 21 judges whether or not the usage rate of sheets of the relevant user is not less than a second threshold value for print limitation (75%, for example) (ACT604). Here, that the second threshold value is larger than the first threshold value is determined. In case that the usage rate of sheets of the relevant user is not less than the first threshold value for print limitation and less than the second threshold value (ACT604, NO), the processor 21 prohibits the relevant user from outputting (printing) the image whose security level is a first level ("1", for example) (ACT605), and releases the output prohibition for the image whose security level is other than "1" (ACT606).

For example, the processor 21 obtains the print ID of the sheet which the relevant user has outputted (copied or printed) from the operation log memory area 27d, and in the page memory area 27b, makes the output flag of the page whose security level is "1" out of the pages corresponding to the obtained print ID "true (output prohibition state), and makes the output flag of the page whose security level is other than "1" "false (output permission state). In addition, the processor 21, as the print limitation processing for each user, may store the information ("1", for example) indicating the security level for print limitation corresponding to the relevant user ID in the used amount memory area 27f.

In case that the usage rate of sheets of the relevant user is not less than the second threshold value for print limitation (ACT604, YES), the processor 21 judges whether or not the usage rate of sheets of the relevant user is not less than a third threshold value for print limitation (100%, for example) (ACT607). Here, that the third threshold value is larger than the second threshold value is determined. In case that the usage rate of sheets of the relevant user is not less than the second threshold value for print limitation and less than the third threshold value (ACT607, NO), the processor 21 prohibits the relevant user from outputting (printing) the image whose security level is not more than a second level ("2", for example) (ACT608), and releases the output prohibition for the image whose security level is other than "1" or "2" (ACT609).

For example, the processor 21 obtains the print ID of the sheet which the relevant user has outputted (copied or printed) from the operation log memory area 27*d*, and, in the page memory area 27*b*, makes the output flag of the page whose security level is "1" and "2" out of the pages corresponding to the obtained print ID "true (output prohibition state), and makes the output flag of the page whose security level is not less than "3" "false (output permission state). In addition, the processor 21, as the print limitation processing for each user, may store the information (not more than "2", for example) indicating the security level for print limitation corresponding to the relevant user ID in the used amount memory area 27*f*.

In case that the usage rate of sheets of the relevant user is not less than the third threshold value for print limitation (ACT607, YES), the processor 21 obtains information indicating an authority level of the relevant user (ACT610). For example, the processor 21 asks the authority level of the user to the user administration server 3, and obtains the information indicating the authority level of the relevant user from the user administration server 3. In addition, the authority level of each user may be stored in the HDD 24 of the print server 2.

Obtaining the information indicating the authority level of the user, the processor 21 judges whether or not the authority level of the relevant user is an administrator level (ACT611). In case that the authority level of the user is the administrator level (ACT611, YES), the processor 21 prohibits the relevant user from outputting (printing) the image whose security level is other than a third level ("5", for example) (ACT612).

For example, the processor 21 obtains the print ID of the sheet which the relevant user has outputted (copied or printed) from the operation log memory area 27*d*, and in the page memory area 27*b*, makes the output flag of the all pages whose security levels are other than "5" out of the pages corresponding to the obtained print ID "true (output prohibition state), and makes the output flag of the page whose security level is "5" "false (output permission state). In addition, the processor 21, as the print limitation processing for each user, may store the information (other than "5", for example) indicating the security level for print limitation corresponding to the relevant user ID in the used amount memory area 27*f*.

In addition, in case that the authority level of the user is not the administrator level (ACT611, NO), the processor 21 prohibits the relevant user from outputting (printing) all the images (ACT613). For example, the processor 21 obtains the print ID of the sheet which the relevant user has outputted (copied or printed) from the operation log memory area 27*d*, and makes the output flags of the all pages corresponding to the obtained print ID "true (output prohibition state) in the page memory area 27*b*. In addition, the processor 21, as the print limitation processing for each user, may store that printing all the pages are prohibited corresponding to the relevant user ID in the used amount memory area 27*f*.

In the above-described processings of ACT610-ACT612, if the authority level of the relevant user is the administrator level, the processor 21 permits printing only the image whose security level is not less than "5". According to the above-described processings of ACT610-ACT612, even for the user whose usage rate of sheets is not less than a threshold value to prohibit printing all the images, it becomes possible to control so that printing only the image whose security level is high is permitted depending on the authority level. For example, an administrator can print the image with a previously set security level (security level "5", for example) regardless of the usage rage of sheets.

In addition, the above-described processings of ACT610-ACT612 may be omitted. When the processings of ACT610-ACT612 are omitted, in case that the usage rate of sheets of the relevant user is not less than the third threshold value for print limitation (ACT607, YES), the processor 21 prohibits the relevant user form outputting (printing) all the images, regardless of the authority of the user (ACT613).

In case that the print limitation was performed for the relevant user depending on the usage rate of sheets, the processor 21 judges whether or not the print limitation processings for the all users have been completed (whether or not the print limitation processing for the last user has been completed) (ACT614). Having judged that a next user is present for whom the print limitation processing is to be performed depending on the usage rate of sheets (ACT614, NO), the processor 21 returns to the above-described ACT601, and performs the print limitation processing for the next user. Having judged that the print limitation processings for all the users have been completed (ACT614, YES), the processor ends the relevant print limitation processing.

In the above-described print limitation processing, the processor 21 performs the print limitation depending on the usage rate of sheets. For example, if the usage rate of sheets is higher, the processor 21 limits the printable image to the image whose security level is higher as well. According to the print limitation processing, in case that the usage rate of sheets is high, printing can be limited so as to make the user restrain from printing. According to the print limitation processing, if the usage rate of sheets is higher, it becomes possible not to perform printing the image whose security level is higher as well.

In addition, in the print limitation processing, even in case that the usage rate of sheets is at a level which prohibits printing all the images, if a user is a person who has the authority of a prescribed level or more (an administrator, for example), the processor 21 permits the user to print only the image whose security level is higher than the prescribed level (the largest security level "5", for example). According to the print limitation processing, the administrator can print the image of a high security level regardless of the usage rate of sheets.

In addition, the MFP 1 may execute a part or all of the above-described processings (ACT601-ACT614) which the print server 2 executes. Each of the processings ACT601-ACT614 is a function which the processor can put into practice by executing the program. For this reason, the processor 11 of the MFP 1 can execute each of the processings ACT601-ACT614. If the processor 11 of the MFP 1 executes each of the processings ACT601-ACT514, the stand-alone MFP 1 can put the above-described print limitation processing into practice.

As shown in the first embodiment, since the QR code previously formed on the sheet is scanned or the QR code is formed on the sheet, and the image data of the image formed on the sheet is administered in connection with this QR code, even if an image is newly formed on another sheet, or operation (processing) such as an operation to newly form image data from the image on the sheet is performed, the follow up administration of the image data or the processing of the image can be performed. In addition, the follow up administration of an operation (processing) such as image forming on the sheet, reuse of a sheet, recycle of a sheet, disposition of a sheet and so on is enabled by the QR code formed on the sheet.

(Second Embodiment) Next, a second embodiment will be described. The second embodiment differs from the above-described first embodiment in the configuration of an image forming system. In the second embodiment, the same symbols are given to the same constituent components as the constituent components described in the above-described first embodiment, and the detailed description thereof will be omitted. The second embodiment includes an external system which can communicate with the print server.

Figure 22:
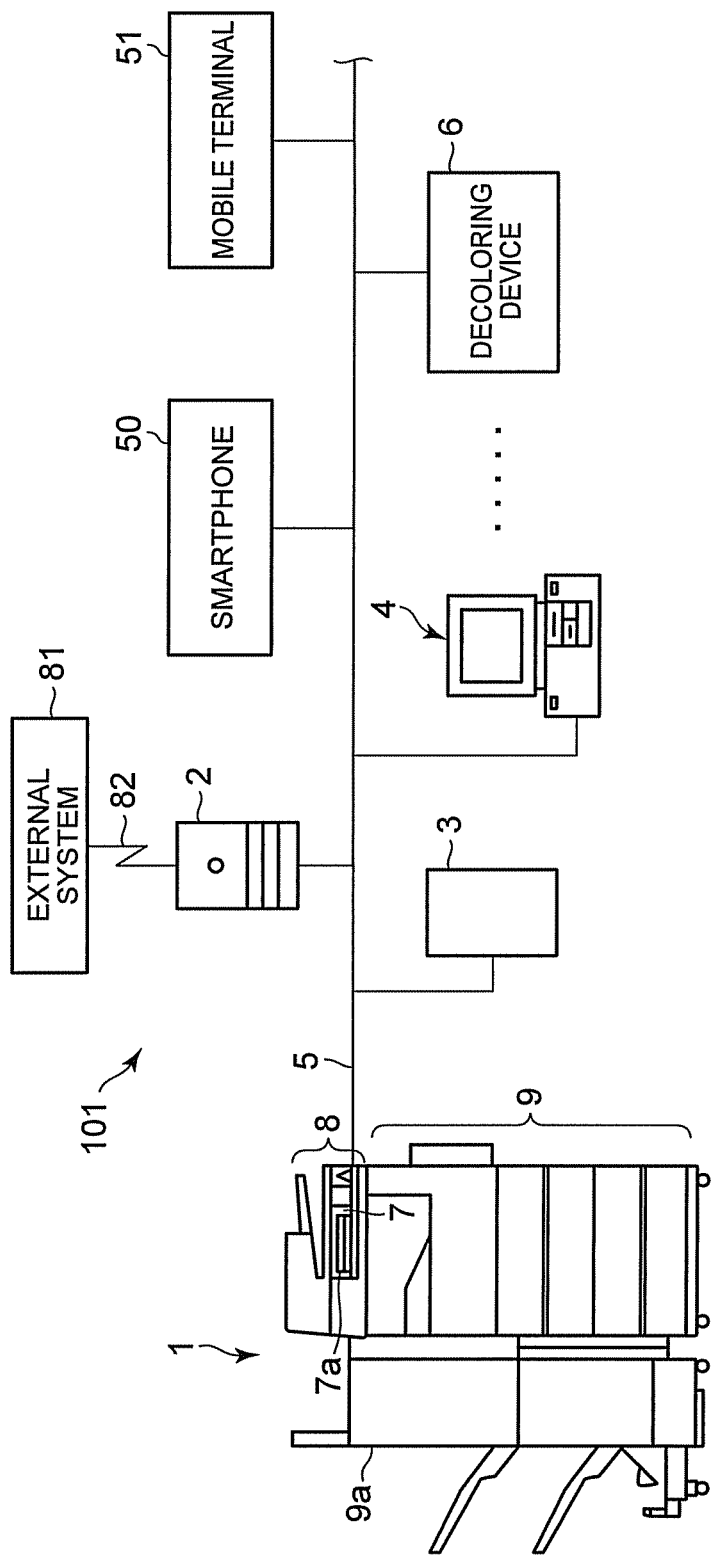
FIG. 22 is a schematic configuration diagram showing a document administration system of a second embodiment.

As shown in FIG. 22, in a document administration system 100 of the second embodiment, the print server 2 is connected to an external system 81 so that they can communicate with each other through a local area network 82. The external system 81 administers data indicating an amount of emission of $CO_2$ generated when the document administration system 101 decolors a sheet or an amount of emission of $CO_2$ generated with the electricity consumption and so on of the document administration system 101.

Figure 23:
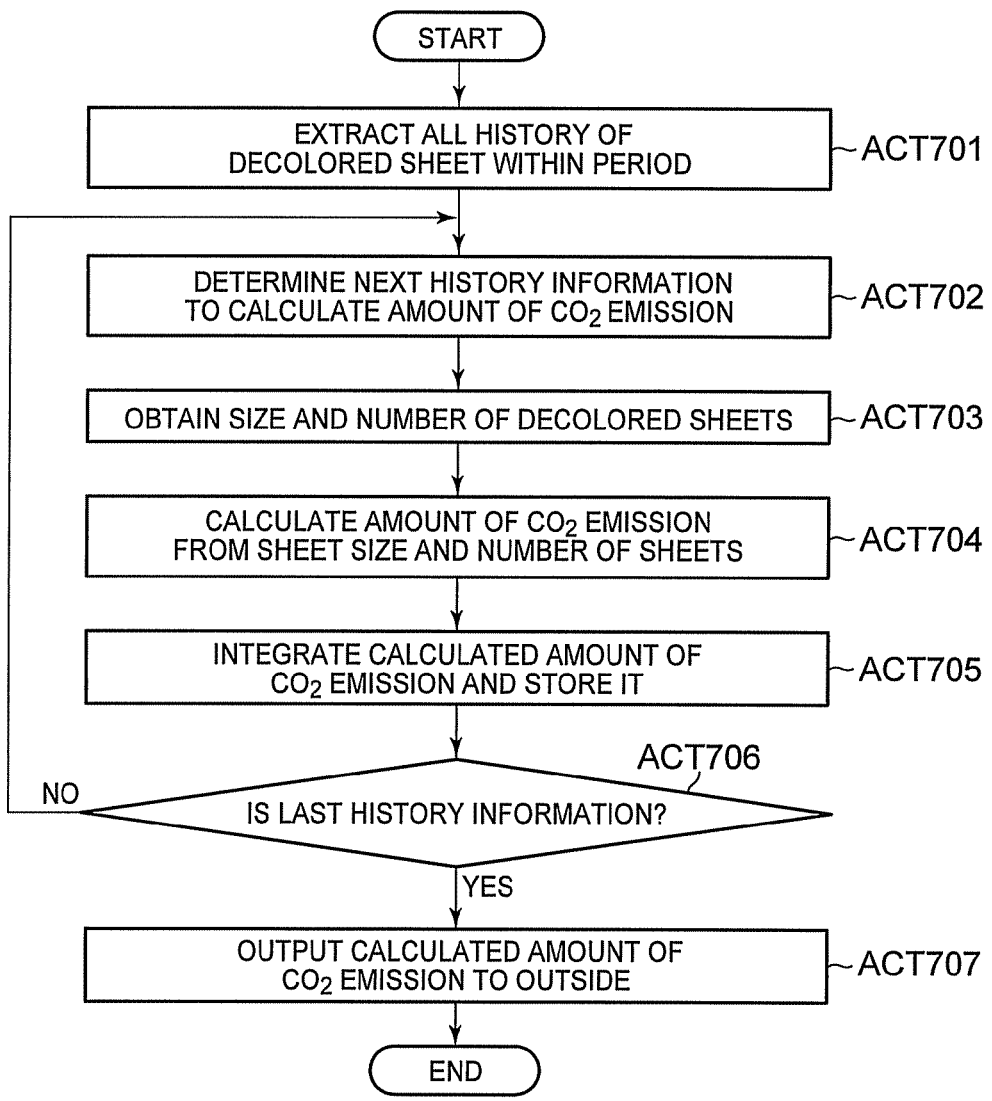
FIG. 23 is a flow chart showing processing to calculate an amount of $CO_2$ emission accompanied with the decoloring of a sheet of the second embodiment.

Next, calculation processing of an amount of emission of carbon dioxide ($CO_2$) accompanied by the sheet decoloring will be described with reference to FIG. 23. The print server 2 is provided with a function to calculate an amount of $CO_2$ emission from an amount of sheets which have been decolored within a certain period (one month, for example). The print server 2 is provided with a function to output the calculated amount of $CO_2$ emission to the external system through the network. As the external system, an ecosystem to monitor the amount of $CO_2$ emission in the whole office is assumed, for example. In addition, the amount of $CO_2$ emission can be calculated for each user, each division, each floor, or each office (the whole document administration system 101). Here, processing to calculate the amount of $CO_2$ emission accompanied by the sheet decoloring in the whole document administration system 101 will be described.

The print server 2 performs processing of calculating an amount of $CO_2$ emission for each period to calculate an amount of $CO_2$ emission (every day, every 10 days, every week, once every month or the like, for example). In addition, the print server 2 may execute the calculation processing of the amount of $CO_2$ emission depending on the administrator of the document administration system 101. The print server 2 can calculate the amount of $CO_2$ emission with the period which the administrator of the document administration system 101 designates. In an example of calculation processing of the amount of $CO_2$ emission shown in FIG. 23, that the processor 21 calculates the amount of $CO_2$ emission depending on the amount of sheets which have been decolored by the all users during a month is assumed.

The processor 21 of the print server 2 extracts the whole history information of the sheets which all users have decolored within a period (one month, for example) from the operation log memory area 27d (ACT701). The processor 21 calculates the amount of $CO_2$ emission from each of the history information in sequence (ACT702). The processor 21 obtains the size and number of the decolored sheets from the history information that is a calculation target (ACT703). The processor 21 calculates the amount of $CO_2$ emission from the amount of $CO_2$ emission for the size of the sheet and the number of sheets (ACT704). It is said that the amount of carbon dioxide generated by burning the sheets of 1 kg is 1.61 kg, for example. The processor 21 integrates the amounts of $CO_2$ emission calculated from each of the history information and stores the integrated amounts in the memory such as the RAM 22 (ACT705).

The processor 21 executes the processings of ACT702 to ACT705 for each history information of the sheets decolored within one month (ACT706). Having calculated the amounts of $CO_2$ emission from the whole history information of the sheets decolored within one month (ACT706, YES), the processor 21 outputs a value obtained by integrating the amounts of $CO_2$ emission calculated from each of the history information stored in the RAM 22 (the amount of $CO_2$ emission calculated from the whole history information) to the external system 81 (ACT707). In addition, that the external system 81 has an interface for data communication and is to be connected to the document administration system 101 through the network is assumed.

The amount of $CO_2$ emission is not limited to that generated by decoloring a sheet, but the amount obtained by converting the energy required for printing an image on a sheet into $CO_2$ may be added. For example, in order to print an image on a sheet, energy such as electric power or developing material (toner, ink and so on) is consumed. As the energy required for printing an image on a sheet, an average value can be set for each size. If the average value of the energy for each sheet size is converted into $CO_2$, the processor 21 can calculate, for each sheet size, the amount of $CO_2$ required for printing.

In the above-described calculating processing of the amount of $CO_2$ emission, the processor calculates the amount of $CO_2$ emission by the sheets decolored within a period from the history information of the sheets decolored within the period. The processor notifies the calculated amount of $CO_2$ emission to the external system as the amount of $CO_2$ emission which is generated by decoloring the sheets in the document administration system 101. According to the above-described calculation processing of the amount of $CO_2$ emission, the external system can grasp the amount of $CO_2$ emission generated by decoloring the sheets in the document administration system 101.

In addition, the MFP 1 may execute a part or all of the above-described processings (ACT701-ACT707) which the print server 2 executes. Each of the processings ACT701 ACT707 is a function which the processor can put into practice by executing the program. For this reason, the processor 11 of the MFP 1 can execute each of the processings ACT701-ACT707. If the processor 11 of the MFP 1 executes each of the processings ACT701-ACT707, the stand-alone MFP 1 can put the above-described calculating processing of the amount of $CO_2$ emission into practice.

Figure 24:
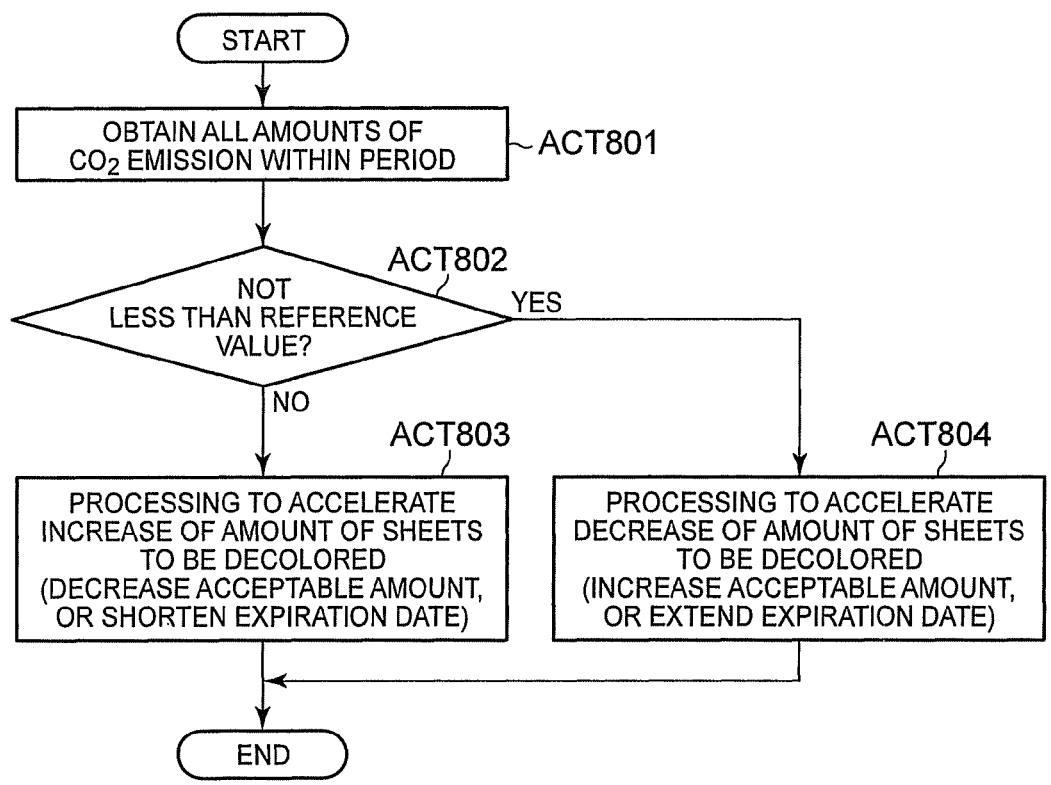
FIG. 24 is a flow chart showing adjustment processing of the amount of sheets to be decolored of the second embodiment.

Next, adjustment processing of the amount of sheets to be decolored depending on the total amount of $CO_2$ emission will be described with reference to FIG. 24. The print server 2 performs the adjustment processing to adjust the amount of sheets to be decolored according to the total amount of $CO_2$ emission in the whole office and so on. For example, the print server 2 adjusts the amount of sheets to be decolored in the document administration system 101, in order to keep the total amount of $CO_2$ emission in the whole office (the whole area including the document administration system 101) including the amount of emission due to the factor other than decoloring sheets such as power consumption constant. For example, that the external system 81 which can communicate with the print server 2 administer the data indicating the total amount of $CO_2$ emission (including the factor such as power consumption) in the whole office for a month is assumed.

The print server 2 performs the adjustment processing of the amount of the sheets to be decolored for each period (every day, every 10 days, every week, or once every month or the like, for example.) to perform the adjustment of the amount of the sheets to be decolored. In addition, the print server 2 may execute the adjustment processing of the amount of sheets to be decolored depending on an instruction of an administrator of the document administration system 101. The print server 2 can also execute the adjustment processing of the amount of sheets to be decolored within a period designated by the administrator. In the example of the adjustment processing shown in FIG. 24, that the processor 21 executes the adjustment processing of the amount of sheets to be decolored once every month is assumed.

The processor 21 of the print server 2 obtains data indicating the total amount of $CO_2$ emission for a month in the whole office from the external system 81 (ACT801). The processor 21 compares the obtained total amount of $CO_2$ emission with a reference value (ACT802). For example, that the reference value of the total amount of $CO_2$ emission for a year is determined in the whole office is assumed. In this case, the reference value of the total amount of $CO_2$ emission for a year is allotted to twelve months to thereby determine the reference value for each month.

In case that the total amount of $CO_2$ emission obtained from the external system 81 is less than the reference value (ACT802, NO), the processor 21 executes processing (acceleration processing to increase the amount of sheets to be decolored) to accelerate increase of the amount of sheets to be decolored in the document administration system 101 (ACT803).

For example, as the acceleration processing to increase the amount of sheets to be decolored, the processor 21 decreases the acceptable amount of sheets of each user (for example, decreases the acceptable amount of sheets of the all users by 5%). The acceptable amount of sheets is decreased to thereby cause each user to accelerate decoloring sheets. In addition, the processor 21 may determine a range of reduction of the acceptable amount from a difference value between the obtained total amount of $CO_2$ emission and the reference value.

In addition, as the acceleration processing to increase the amount to be decolored, the processor 21 may shorten the expiration date of an image printed on a sheet (shorten the expiration date of two months ahead by one month). The expiration date is shortened to thereby cause each user to accelerate decoloring sheets. In addition, the processor 21 may determine an amount to shorten the expiration date from a difference value between the obtained total amount of $CO_2$ emission and the reference value.

In case that the total amount of $CO_2$ emission obtained from the external system 81 is not less than the reference value (ACT802, YES), the processor 21 executes processing (acceleration processing to decrease the amount of sheets to be decolored) to accelerate decrease of the amount of sheets to be decolored in the document administration system 101 (ACT804). For example, as the acceleration processing to decrease the amount to be decolored, the processor 21 increases the acceptable amount of sheets of each user (for example, increases the acceptable amount of sheets of the all users by 5%). The acceptable amount of sheets is increased to thereby cause each user to accelerate the delay of decoloring sheets. In addition, the processor 21 may determine a range of increase of the acceptable amount from a difference value between the obtained total amount of $CO_2$ emission and the reference value.

In addition, as the acceleration processing to decrease the amount of sheets to be decolored, the processor 21 may extend the expiration date of an image printed on a sheet (extends the expiration date of not more than one month by one month). The expiration date is extended to thereby cause each user to accelerate the delay of decoloring sheets. In addition, the processor 21 may determine an amount to extend the expiration date from a difference value between the obtained total amount of $CO_2$ emission and the reference value.

In the above-described adjustment processing, the processor 21 obtains the total amount of $CO_2$ emission by the power consumption and so on from the external system 81, and if the total amount of $CO_2$ emission is not less than the reference value, the processor 21 executes the acceleration processing to decrease the amount of sheets to be decolored, and if the total amount of $CO_2$ emission is less than the reference value, the processor 21 executes the acceleration processing to increase the amount of sheets to be decolored. According to the adjustment processing, it becomes possible to make the total amount of $CO_2$ emission close to the reference value by decoloring the sheets in the document administration system 101.

In addition, the MFP 1 may execute a part or all of the above-described processings (ACT801-ACT804) which the print server 2 executes. Each of the processings ACT801-ACT804 is a function which the processor can put into practice by executing the program. For this reason, the processor 11 of the MFP 1 can execute each of the processings ACT801-ACT804. If the processor 11 of the MFP 1 executes each of the processings ACT801-ACT804, the stand-alone MFP 1 can put the above-described adjustment processing into practice.

As shown in the second embodiment, since the QR code previously formed on the sheet is scanned, or the QR code is formed on the sheet, and the image data of the image formed on the sheet is administered in connection with this QR code, the follow-up administration of the image data or the image processing can be performed in the same manner as in the first embodiment. In addition, the operation (processing) of the sheets can be followed up by the QR code formed on the sheet. According to the second embodiment, since the operation (processing) of the sheet can be followed up by the QR code, the amount of $CO_2$ can be administered in case that the sheet is operated (processed).

As shown in the first embodiment and the second embodiment, the follow up administration of the image data of the image formed on the sheet in connection with the QR code of the sheet is enabled, and the operation (processing) of the sheet can be followed up.

While certain embodiments have been described, those embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A document administration system, comprising:
an image forming device to form an image on a recording medium;
an administration apparatus configured to administer administration information of the image formed on the recording medium in connection with discrimination information of the recording medium, the administration information including security information representing a security level; and
a decoloring apparatus configured to decolor a decoloring image formed on the recording medium, the decoloring apparatus including:
a reading device to read the discrimination information image based on the discrimination information formed on the recording medium;
a display unit to receive a decolor entry of the decoloring image and display a decolor entry image plane;
a decoloring device to decolor the decoloring image formed with erasable coloring agent on the recording medium and displayed on the display unit as a function of the security level and based on a reading result of the reading device, the reading result including the security information;
a first eject tray to recover the recording medium which is reusable after the decoloring image has been decolored by the decoloring device;
a second eject tray to recover the recording medium which is not reusable and is normally to be disposed for recycling processing; and
a third eject tray differing from the first and second eject trays to recover and perform a security disposition on the recording medium with a high security level recognized from the discrimination information image read by the reading device.

2. The system of claim 1, wherein the administration apparatus includes an information memory device to store the administration information in connection with the discrimination information, and updates the information memory device each time the decoloring device in the decoloring apparatus decolors the image.

3. The system of claim 1, further comprising:
a non-decoloring image forming device to form the image with unerasable coloring agent, and forms the discrimination information image on the recording medium by the non-decoloring image forming device.

4. The system of claim 1, wherein the third eject tray keeps the security by a key.

5. The system of claim 1, wherein the third eject tray keeps a security key by a password.

6. A decoloring apparatus comprising:
an image forming device to form an image on a recording medium;
a reading device to read a discrimination information image based on the discrimination information formed on the recording medium, the discrimination information being connected with the administration information of the image formed on the recording medium, the administration information being interested by an administration device and including a security information representing a security level;
a decoloring device to decolor a decoloring image formed with erasable coloring agent on the recording medium as a function of the security level and based on a reading result of the reading device, the reading result including the security information, the decoloring device including a display unit to receive a decolor entry of the decoloring image and display a decolor entry image plane, wherein the decoloring device decolors the decoloring image displayed on the display unit; and
a first eject tray to recover the recording medium which is reusable after the decoloring image has been decolored by the decoloring device;
a second eject tray to recover the recording medium which is not reusable and is normally to be disposed for recycling processing; and
a third eject tray differing from the first and second eject trays to recover and perform a security disposition on the recording medium with a high security level recognized from the discrimination information image read by the reading device.

7. The device of claim 6,
wherein the third eject tray includes a security box, the recording medium being conveyed to the security box to perform the security disposition on the recording medium.

8. The device of claim 7, wherein the security box keeps the security by a key.

9. The device of claim 7, wherein the security box keeps the security by a password.

10. A document administration method in a document administration system including an administration apparatus and a decoloring apparatus, comprising:
forming an image on a recording medium;
administering, in the administration apparatus, administration information of the image formed on the recording medium in connection with discrimination information of the recording medium, the administration information including security information representing a security level;
reading, in the decoloring apparatus, the discrimination information image based on the discrimination information formed on the recording medium;
receiving a decolor entry of a decoloring image and displaying a decolor entry image plane;
decoloring, in the decoloring apparatus, the decoloring image formed with erasable coloring agent on the recording medium and displayed in the displaying step as a function of the security level and based on the reading the discrimination information image based on a reading result of the reading step, the reading result including the security information; and
recovering the recording medium which is reusable after the decoloring image has been decolored by the decoloring device in a first eject tray;
recovering the recording medium which is not reusable and is normally to be disposed for recycling processing in a second eject tray; and
recovering and performing a security disposition on the recording medium with a high security level recognized from the discrimination information image read in a third eject tray differing from the first and second eject trays.

11. The method of claim 10, further comprising:
storing the administration information in connection with the discrimination information in an information memory device.

12. The method of claim 11, further comprising:
  updating the information memory device each time the decoloring the decoloring image formed on the recording medium.

* * * * *